(12) United States Patent
Llamazares Domper

(10) Patent No.: US 10,579,882 B1
(45) Date of Patent: Mar. 3, 2020

(54) SENSOR MODULE

(71) Applicant: Arturo Llamazares Domper, Campbell, CA (US)

(72) Inventor: Arturo Llamazares Domper, Campbell, CA (US)

(73) Assignee: Apple Inc., Cupertino, CA (US)

( * ) Notice: Subject to any disclaimer, the term of this patent is extended or adjusted under 35 U.S.C. 154(b) by 183 days.

(21) Appl. No.: 15/677,443

(22) Filed: Aug. 15, 2017

Related U.S. Application Data

(60) Provisional application No. 62/396,985, filed on Sep. 20, 2016.

(51) Int. Cl.
*G06K 9/00* (2006.01)
*B60R 11/04* (2006.01)
*G05D 1/02* (2006.01)
*G01S 13/86* (2006.01)

(52) U.S. Cl.
CPC .......... *G06K 9/00791* (2013.01); *B60R 11/04* (2013.01); *G01S 13/867* (2013.01); *G05D 1/0231* (2013.01); *G05D 2201/0213* (2013.01)

(58) Field of Classification Search
CPC combination set(s) only.
See application file for complete search history.

(56) References Cited

U.S. PATENT DOCUMENTS

| | | | |
|---|---|---|---|
| 3,842,930 A * | 10/1974 | Fiala | B60R 21/0136 180/274 |
| 7,347,465 B2 | 3/2008 | Jayasuriya et al. | |
| 9,033,092 B1 | 5/2015 | Rao et al. | |
| 9,352,682 B2 | 5/2016 | Lombrozo | |
| 9,855,914 B1 * | 1/2018 | Hammer | B60R 19/023 |
| 2002/0116966 A1 * | 8/2002 | Suzuki | B60R 25/02144 70/247 |
| 2003/0122929 A1 * | 7/2003 | Minaudo | B60R 1/00 348/148 |
| 2006/0171704 A1 * | 8/2006 | Bingle | B60R 11/04 396/419 |
| 2007/0055410 A1 * | 3/2007 | Morohoshi | G06F 3/0362 700/302 |
| 2008/0316312 A1 * | 12/2008 | Castillo | B60R 25/1004 348/148 |
| 2014/0116592 A1 * | 5/2014 | Bushnell | B60C 11/1612 152/210 |
| 2014/0267586 A1 * | 9/2014 | Aguilar | H04N 5/23238 348/36 |
| 2014/0365095 A1 * | 12/2014 | Lee | B60T 7/22 701/70 |

(Continued)

*Primary Examiner* — Alexander Gee
(74) *Attorney, Agent, or Firm* — Young Basile Hanlon & MacFarlane, P.C.

(57) ABSTRACT

A vehicle includes a vehicle body having an outer surface, and a sensor that is arranged to observe an environment. The sensor is located within the vehicle body. The vehicle also includes a movement mechanism for moving the sensor from an outward position to an inward position relative to the vehicle body. The movement mechanism moves the sensor from the outward position to the inward position in response to a signal. In an alternative implementation, the sensor is disposed in a sensor module, and the sensor module is able to move relative to the vehicle body from an outboard position to an inboard position in response to application of an external force to the sensor module.

26 Claims, 29 Drawing Sheets

(56) References Cited

U.S. PATENT DOCUMENTS

| | | | |
|---|---|---|---|
| 2015/0128697 A1* | 5/2015 | Kim | G01D 11/10 73/430 |
| 2015/0360619 A1* | 12/2015 | Barthel | B60R 11/04 348/148 |
| 2016/0119541 A1* | 4/2016 | Alvarado-Moya | G06T 3/4038 348/38 |
| 2017/0101307 A1* | 4/2017 | Lim | H01L 24/48 |

* cited by examiner

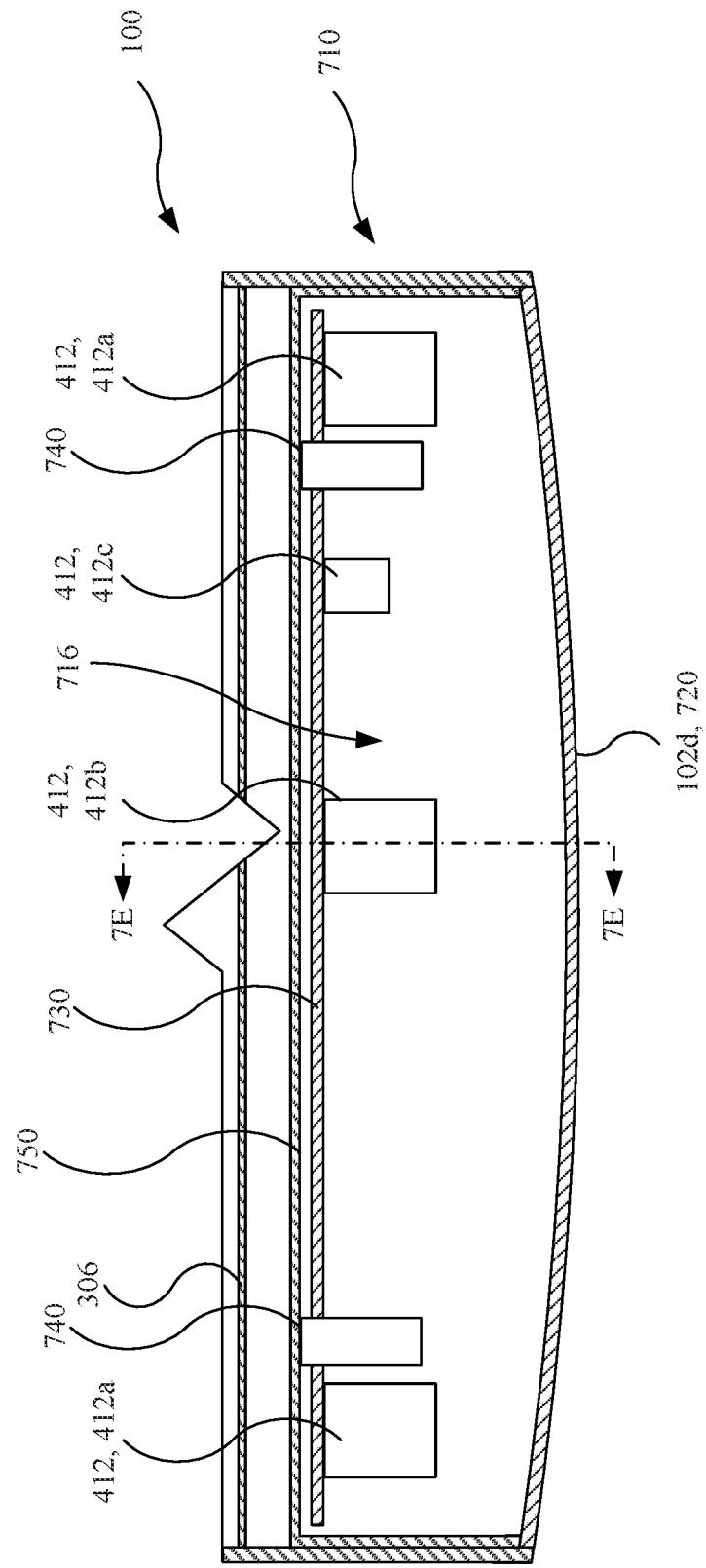

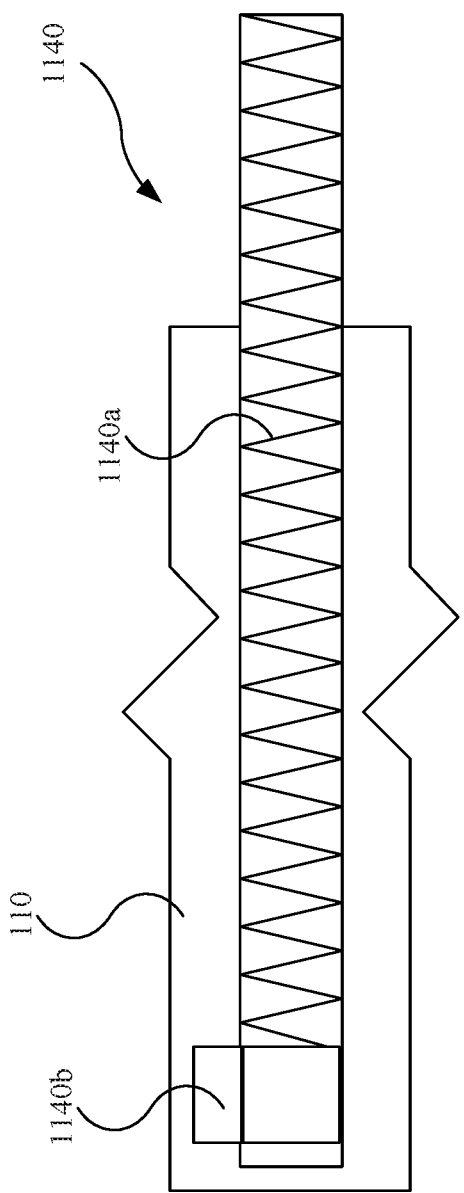
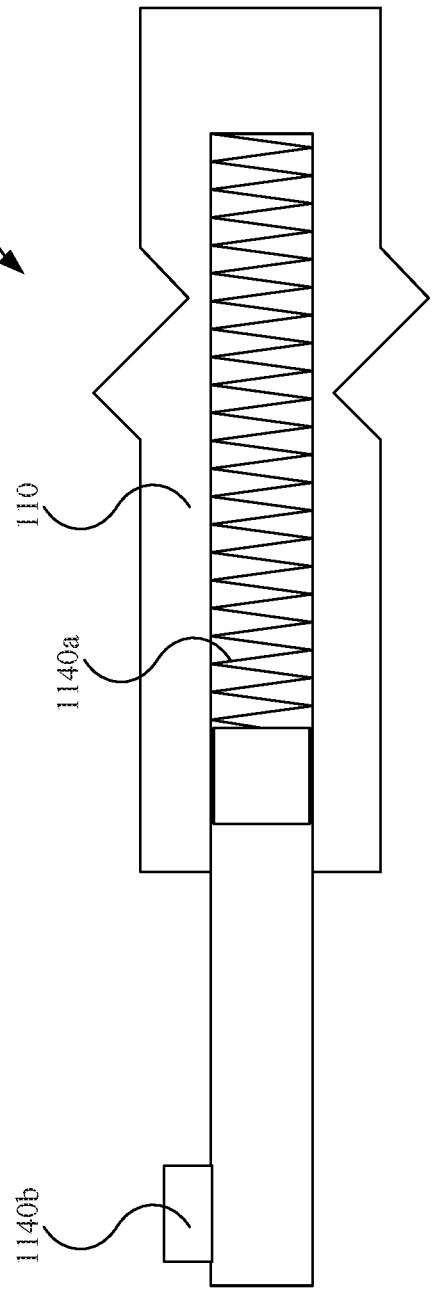
FIG. 11A
FIG. 11B

SENSOR MODULE

CROSS-REFERENCE TO RELATED APPLICATION(S)

This application claims the benefit of U.S. Patent No. 62/396,985, filed on Sep. 20, 2016, entitled "Sensor Module," the content of which is incorporated herein by reference in its entirety.

TECHNICAL FIELD

This disclosure relates to sensors for vehicles and, in particular, sensor modules for observing environments of vehicles.

SUMMARY

The disclosure includes sensors and sensor modules that are movable, either actively or passively. Active systems can move the sensors and/or sensor modules upon detection or expectation of an impact to the vehicle. Passive systems can move the sensors and/or sensor modules in response to application of an external force.

One aspect of the disclosure is a vehicle that includes a vehicle body having an outer surface, and a sensor that is arranged to observe an environment. The sensor is located within the vehicle body. The vehicle also includes a movement mechanism for moving the sensor from an outward position to an inward position relative to the vehicle body. The movement mechanism moves the sensor from the outward position to the inward position in response to a signal.

Another aspect of the disclosure is a vehicle that includes a vehicle body and an opening defined by the vehicle body. A sensor module is located in the opening, is movably mounted relative to the vehicle body, and defines an interior. A sensor disposed in the interior of the sensor module. The sensor module is able to move relative to the vehicle body from an outboard position to an inboard position in response to application of an external force to the sensor module.

Another aspect of the disclosed embodiments is a vehicle that includes a vehicle body, and a sensor module that is connected to the vehicle body and defines an interior. The sensor module has an outer portion and an inner portion, wherein the outer portion is less rigid than the inner portion to allow deformation in response to application of an external force. A sensor is disposed in the interior of the sensor module and is connected to the inner portion of the sensor module.

BRIEF DESCRIPTION OF THE DRAWINGS

FIG. 7C is another partial cross-sectional view taken along line 7B-7B in FIG. 7A, which depicts the sensor module in a second configuration.

FIG. 11A is a top view of another movement device in a first configuration.

FIG. 11B is a top view of the movement device of FIG. 11A in a second configuration.

DETAILED DESCRIPTION

Figure 1:
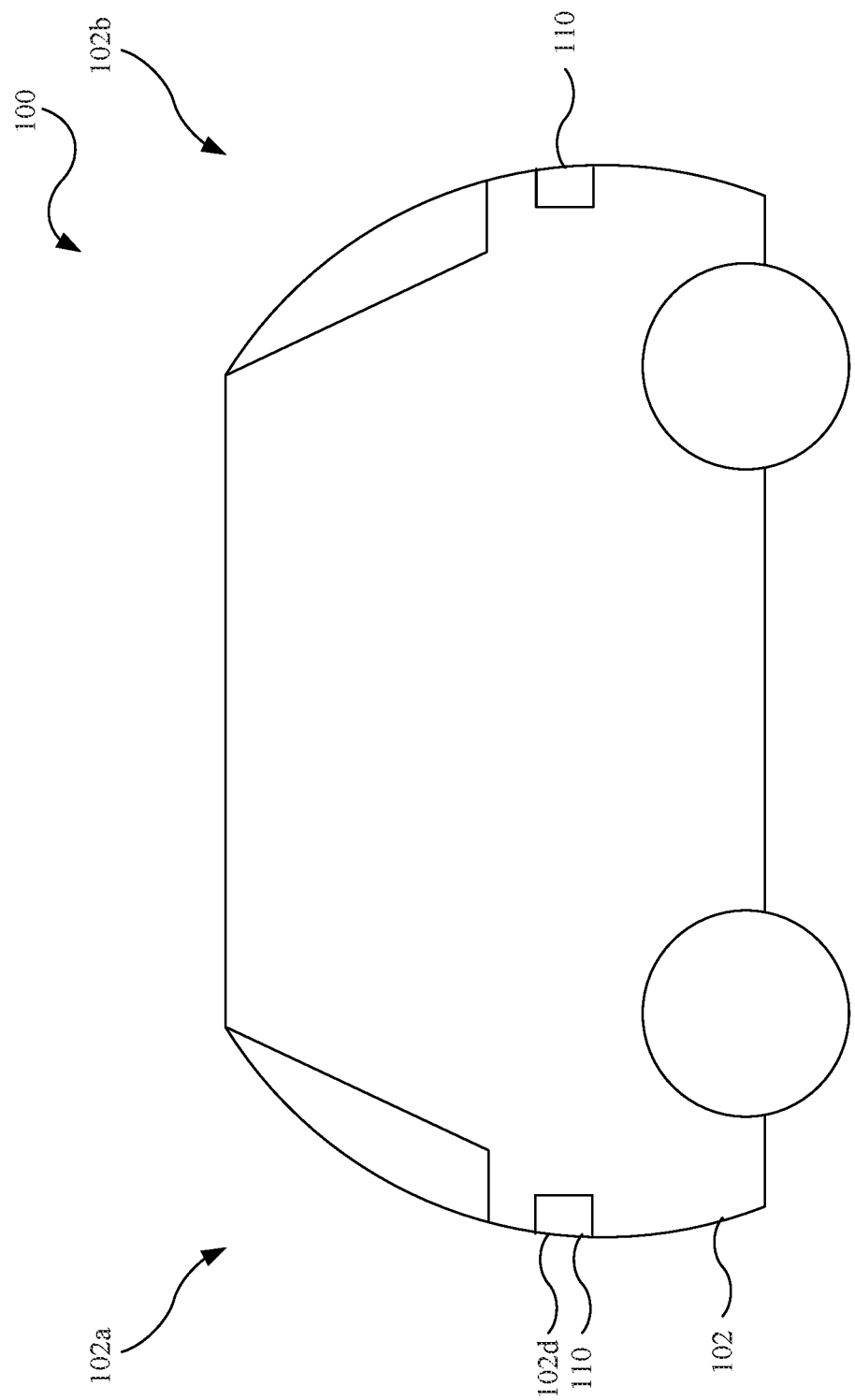
FIG. 1 is a side view of an embodiment of a vehicle.
Figure 2:
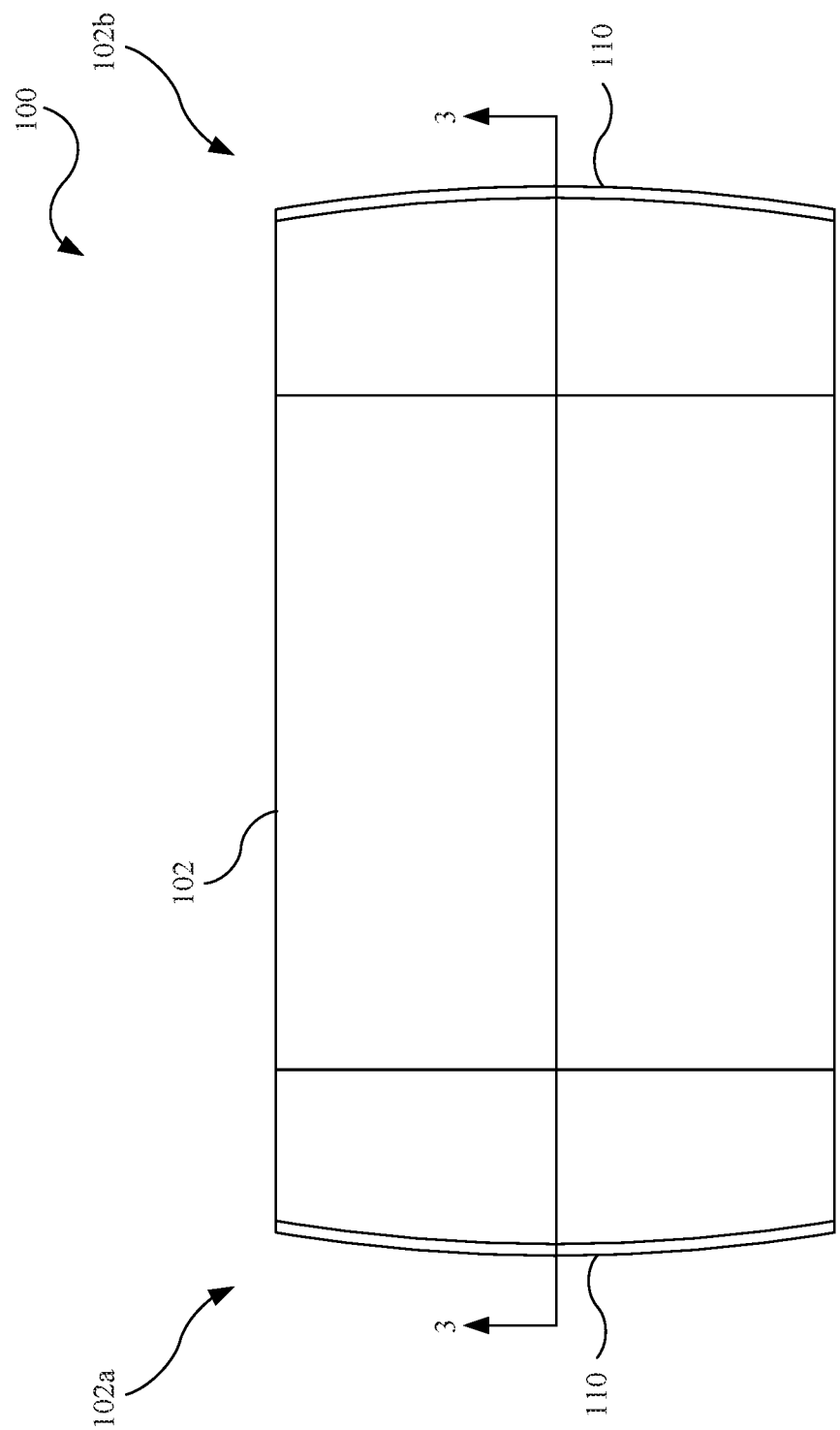
FIG. 2 is a top view of the vehicle shown in FIG. 1.
Figure 3:
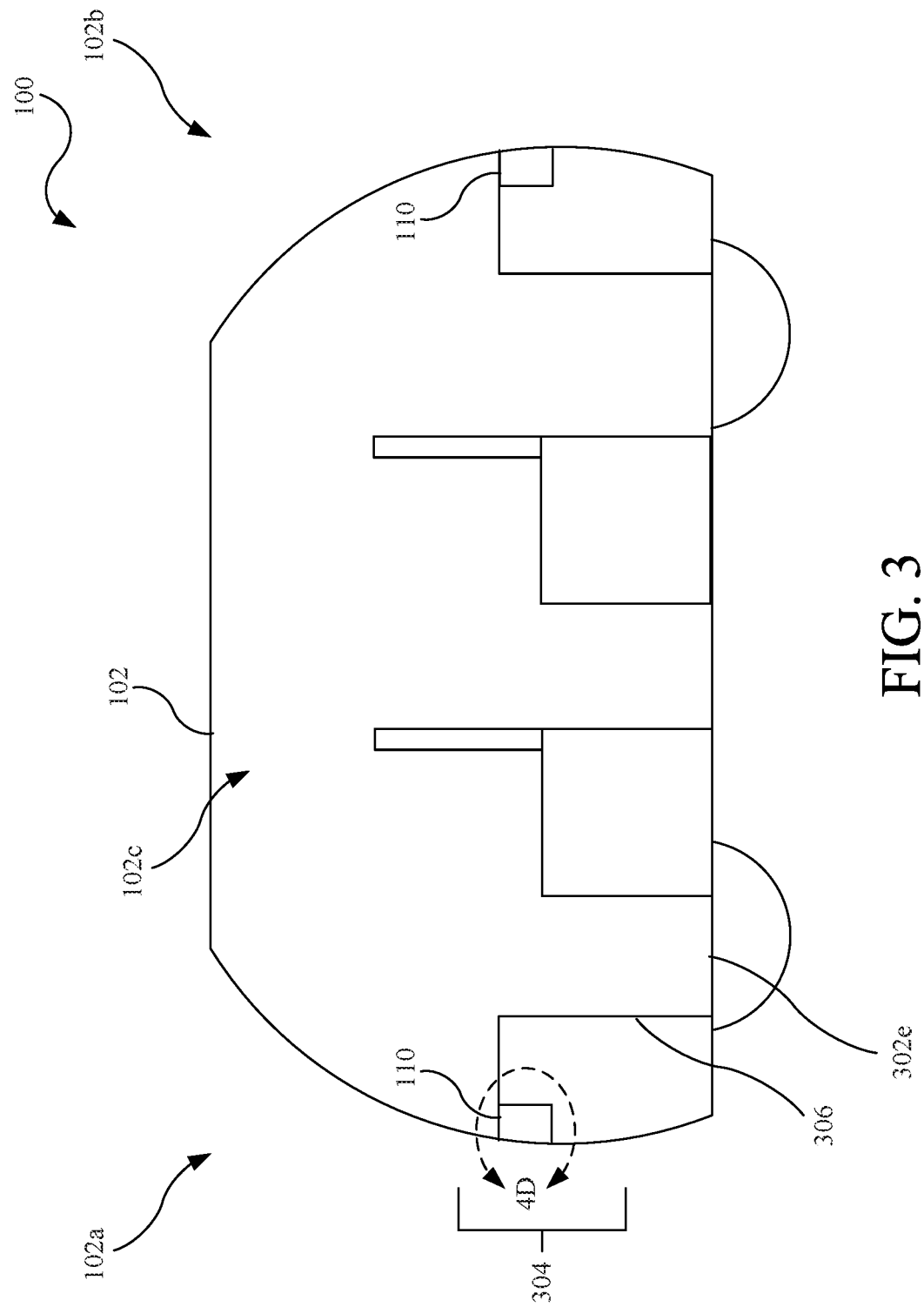
FIG. 3 is a cross-sectional view cross-sectional view taken along line 3-3 in FIG. 2.

Referring to FIGS. 1-3, a vehicle 100 (e.g., a passenger vehicle) includes one or more sensor modules 110, which are arranged at a front end 102a of a vehicle body 102 of the vehicle 100, a rear end 102b of the vehicle body 102, or both (as shown). The vehicle body 102 additionally defines a passenger compartment 102c and includes an outer surface 102d. As discussed in further detail below, the sensor modules 110, and the various embodiments thereof and/or various portions thereof, are movable in response to or in expectation of impacts therewith to protect sensors thereof from damage and/or to improve pedestrian protection performance. In the illustrated example, the vehicle 100 is a road-going automobile. The sensors modules 110 that are described herein can, however, be applied to many different types of vehicles. For example, the sensor modules 110 could be incorporated in a boat.

Referring to FIGS. 4A-4E, the sensor modules 110 each include one or more sensors 412, which are configured to observe an external environment of the vehicle 100 for use in autonomous or semi-autonomous driving (e.g., controlling speed and/or direction of the vehicle 100 according to observations of the external environment) or other uses. In other implementations, the sensor modules can be provided that have one or more sensors that are configured to observe an internal environment of the vehicle 100, such as the passenger compartment 102c. The sensors 412 may, for example, include a camera 412a (e.g., camera system), a range sensor 412b (e.g., radar, sonar, LIDAR, or other object detection and/or range determining sensors or systems), and/or another sensor 412c of another type. Unless provided otherwise, each type of sensor (e.g., the camera 412a, the range sensor 412b, and/or the other sensor 412c) may be referred to as one of the sensors 412.

The sensors 412 are recessed within the vehicle body 102 of the vehicle 100, so as to be positioned inward of an outer surface 102d of the vehicle 100 toward a passenger compartment 102c defined by the vehicle body 102. During normal operation, the sensors 412 are proximate the outer surface 102d to provide each sensor 412 with a field of view 414 (e.g., primary field of view) that extends upward and downward between other structures of the vehicle 100, such as an upper body panel 402f (e.g., trim panel) and a lower body panel 402g (e.g., trim panel) of the vehicle body 102. The upper body panel 402f and the lower body panel 402g may form portions of the outer surface 102d of the vehicle body 102. Thus, the sensors 412 may be positioned in an opening that is defined in an opening that is located between the upper body panel 402f and the lower body panel 402g (i.e. below the upper body panel 402 and above the lower body panel 402g).

The sensors 412 may also be positioned in a vertical region 304 of the vehicle 100 at which the outer surface 102d protrudes outward (e.g., forming the forward most or rearward most surface of the vehicle 100) or is otherwise prone to impacts with other vehicles or passengers. The sensor module 110 and the sensors 412 are, thereby, vulnerable to damage from impacts. Such damage to the sensors 412 may be expensive to repair and/or render inoperable the vehicle 100, if autonomous or semi-autonomous, or render inoperable certain features related to the sensors 412.

Figure 4A:
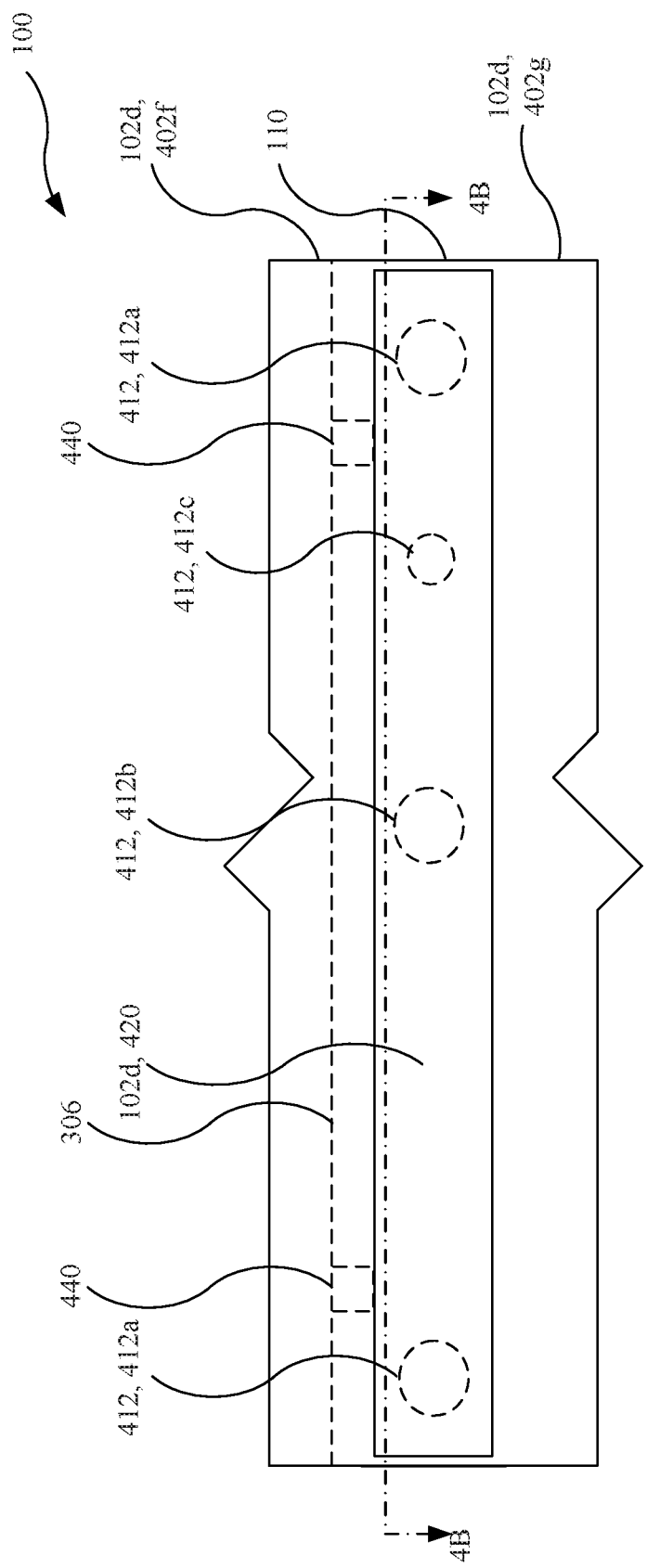
FIG. 4A is a partial front view of the vehicle shown in FIG. 1 with hidden components of a sensor module depicted in broken lines.
Figure 4B:
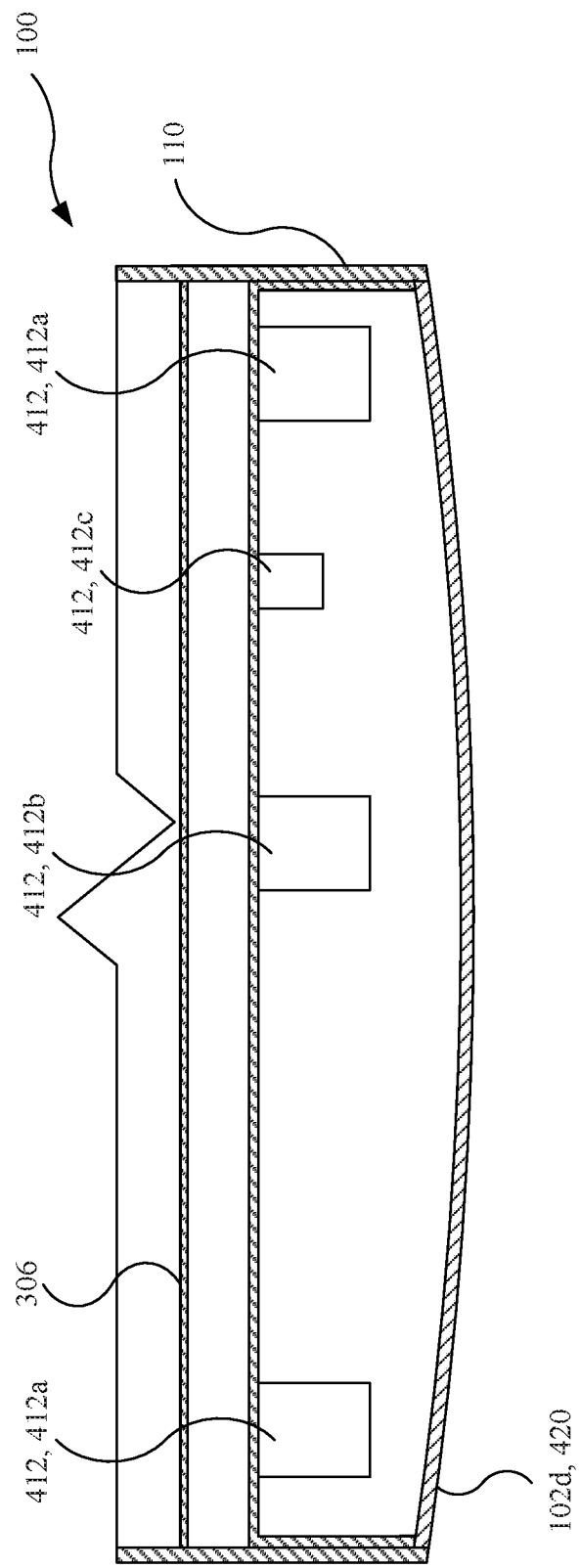
FIG. 4B is a partial cross-sectional view taken along line 4B-4B in FIG. 4A, which depicts the sensor module of the vehicle in a first configuration.
Figure 4C:
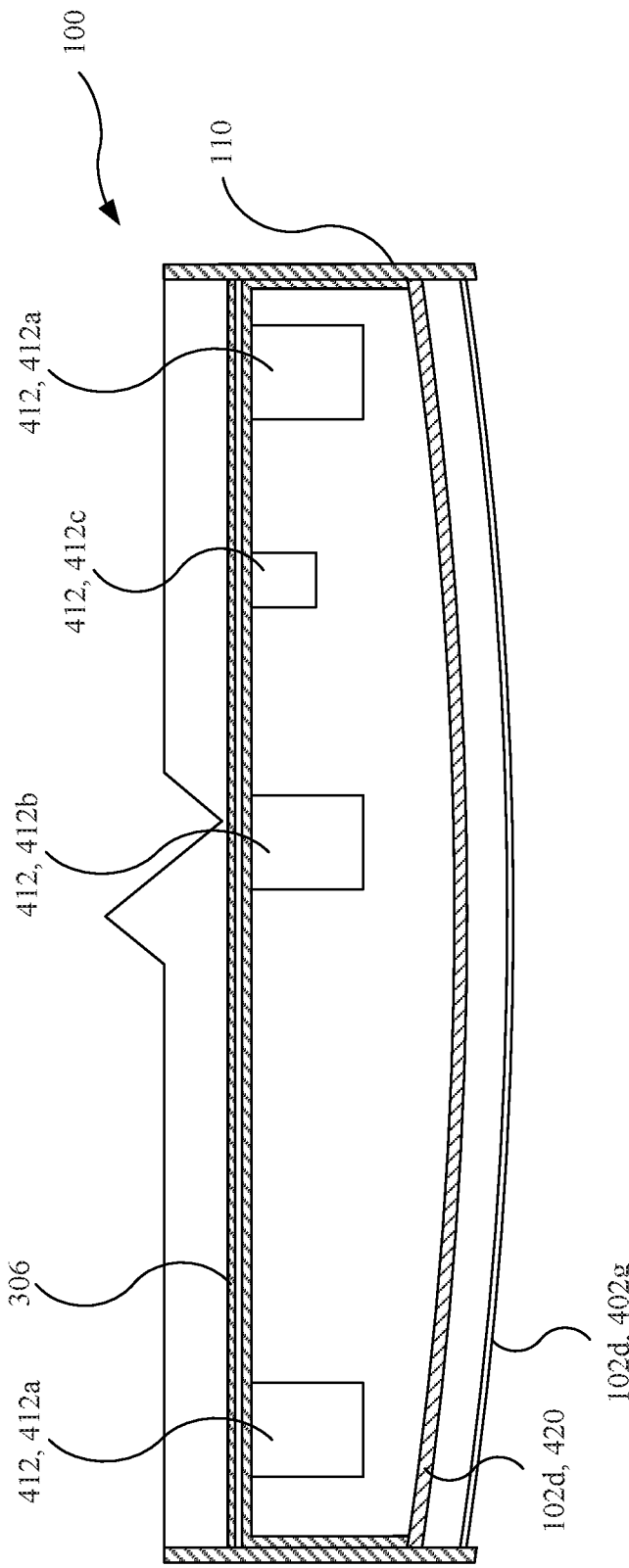
FIG. 4C is another partial cross-sectional view taken along line 4B-4B in FIG. 4A, which depicts the sensor module in a second configuration.
Figure 4D:
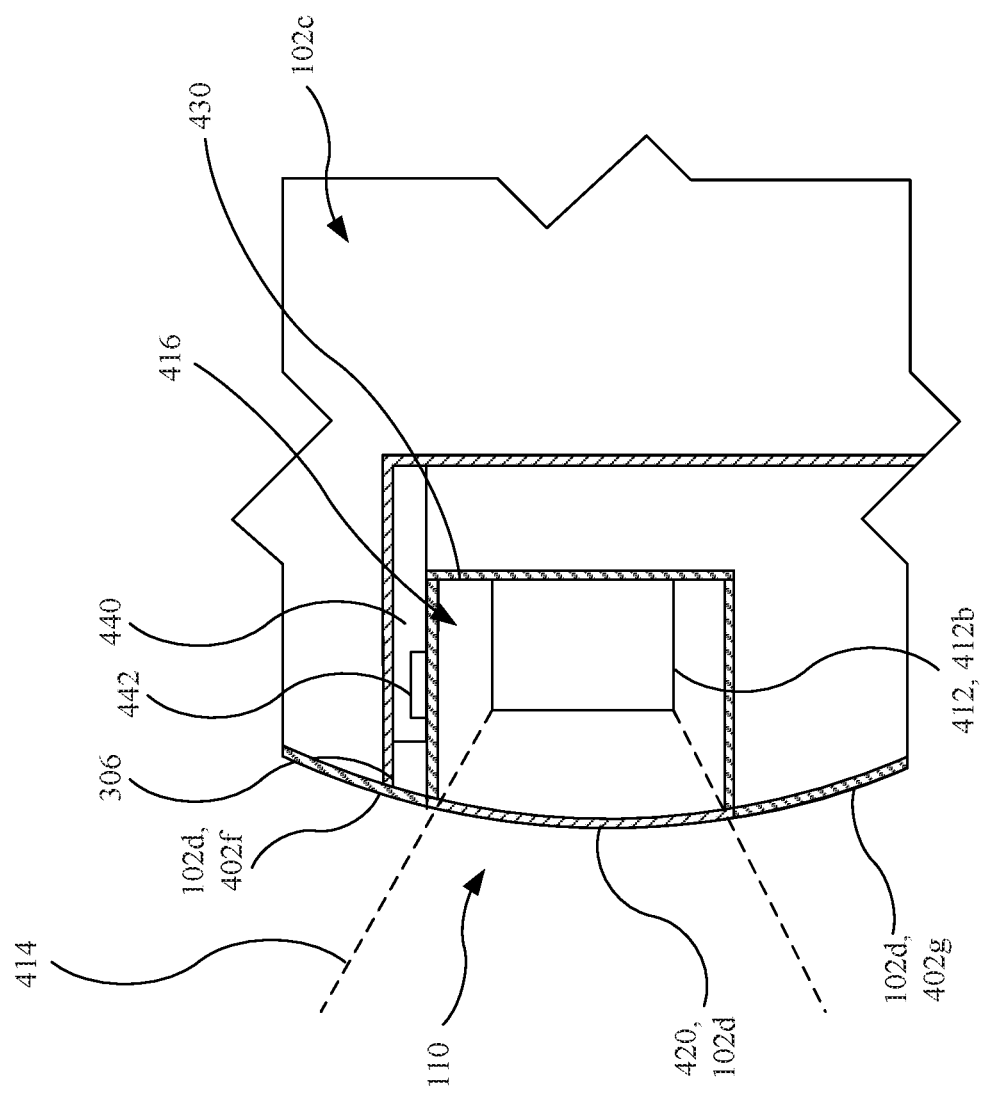
FIG. 4D is a detail view taken from line 4D in FIG. 3, which depicts the sensor module in the first configuration.
Figure 4E:
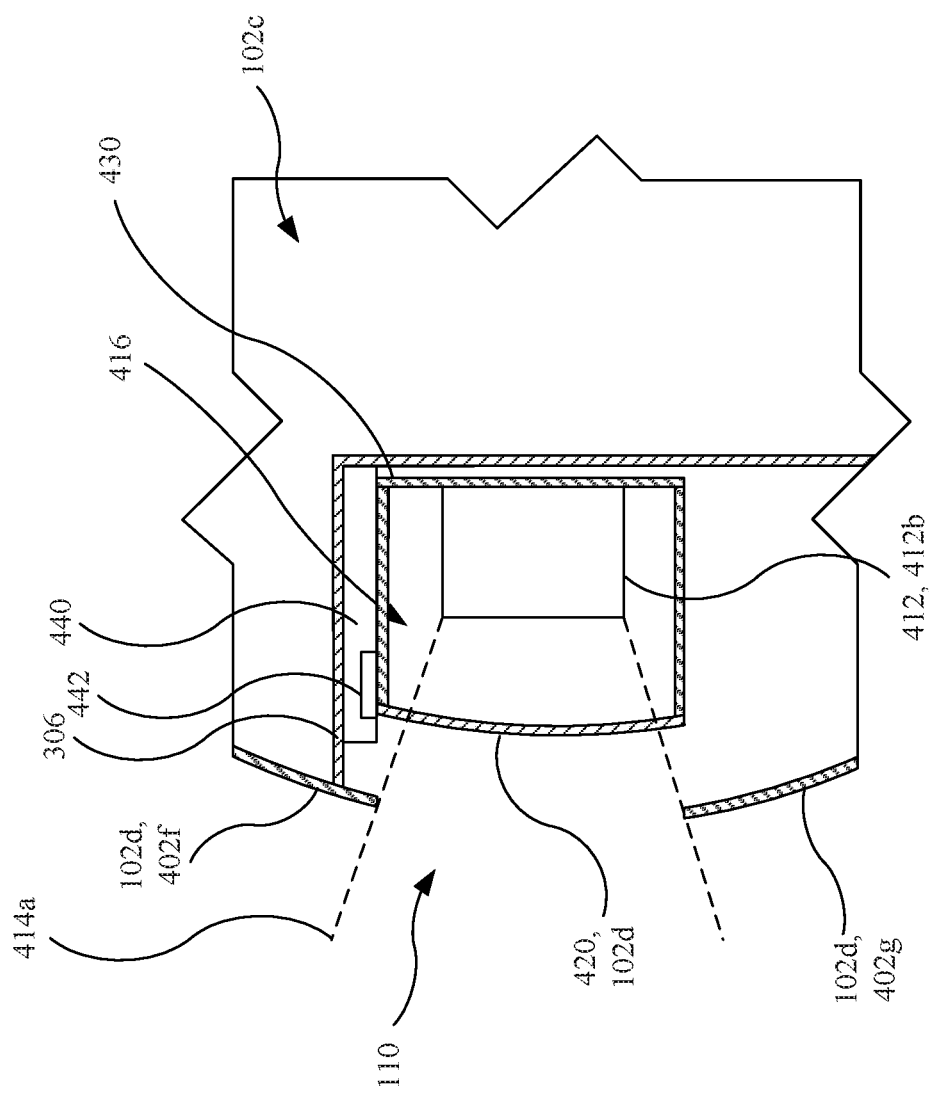
FIG. 4E is a detail view taken from line 4D in FIG. 3, which depicts the sensor module in the second configuration.

With reference to FIGS. 4B-4E, the sensor module 110 is movable (e.g., retractable) from an outward position (e.g., first, outer, forward, rearward, or outward module position; shown in FIGS. 4B and 4D) to an inward position (e.g., second, inner, rearward, forward, or inward module position; shown in FIGS. 4C and 4E), so as to protect the sensors 412 from damage and/or absorb energy from an impact. More particularly, the sensor module 110 moves as a unit, including the sensors 412, inward in response to, or otherwise as a result of, an impact or expected impact therewith. The inward position and the outward position of the sensor module 110 are predefined positions relative to a fixed portion of the vehicle 100. For example, the outward position and the inward position may be defined in relation to an inner vehicle structure 306 (e.g., frame, support, etc.) of the vehicle body 102 to which the sensor module 110 is coupled. Instead or additionally, the outward position and the inward position may be defined in relation to another portion of the vehicle 100, such as a central portion of the floor structure 302e of the vehicle body 102, that is generally unaffected (e.g., undeformed) as a result of a low magnitude impact, such as a low speed impact with another vehicle or an impact with a pedestrian.

The sensor module 110 includes an outer module structure 420 (e.g., outer, exterior, or visible panel, surface, structure, etc.), an inner module structure 430 (e.g., interior or hidden frame, base, or structure), and one or more movement mechanisms 440.

The outer module structure 420 and the inner module structure 430 cooperatively define an interior region 416 (e.g., void, cavity, housing, etc.) in which the sensors 412 are positioned and coupled to the inner module structure 430. The sensors 412 are arranged within the interior region 416 with their respective fields of view 414 facing outward relative to the passenger compartment 102c (e.g., in a forward, rearward, and/or sideward direction). The outer module structure 420 and the inner module structure 430 may additionally seal, form a housing around, or otherwise protect the sensors 412 from external environmental conditions (e.g., rain, snow, etc.) that might otherwise damage electronics of the sensors 412. Alternatively, the outer module structure 420 may engage another portion of the vehicle body 102 (e.g., the upper body panel 402f, the lower body panel 402g, and/or seal members (not shown)) to protect the sensors 412 from such environmental conditions.

The outer module structure 420 forms the outer surface 102d (or a portion thereof) of the vehicle 100, and allows the sensors 412 to observe the external environment. The outer module structure 420 may be formed entirely or locally of one or more materials that allow transmission of wave types detected by the sensors 412 (e.g., optically translucent material, such as glass, polycarbonate, etc., for the cameras 412a).

The inner module structure 430 is movably mounted via the one or more movement mechanisms 440 directly or indirectly to the inner vehicle structure 306 (e.g., frame, support, etc.). The movement mechanisms 440 stably mount the sensor module 110 and the sensors 412 to the vehicle 100 and allow or cause movement thereof from the outward position to the inward position along a predefined movement path. Thereby, the movement mechanisms 440 (e.g., one or more common movement mechanisms) move the sensors 412 together from respective outward positions (e.g., outward sensor positions) to respective inward positions (e.g., inward sensor positions), which are also predefined relative to a fixed portion of the vehicle 100 or vehicle body 102. In the outward positions, the sensors 412 are positioned and oriented to observe the external environment of the vehicle 100 through the field of view 414 for autonomous or semi-autonomous control of the vehicle 100. In the inward positions, the sensors 412 may have a restricted field of view 414a, which is comparatively limited by the other structures of the vehicle 100 (e.g., the upper body panel 402f and the lower body panel 402g). In some implementations, however, the vertical height of the outer module structure 420 is selected such that it is large enough to limit or eliminate reduction in the size of the restricted field of view 414a relative to the field of view 414. Thus, continued operation of the sensors 412 in a manner that permits continuation of autonomous control may be possible when the sensors 412 are in their respective inward positions.

Figure 5A:
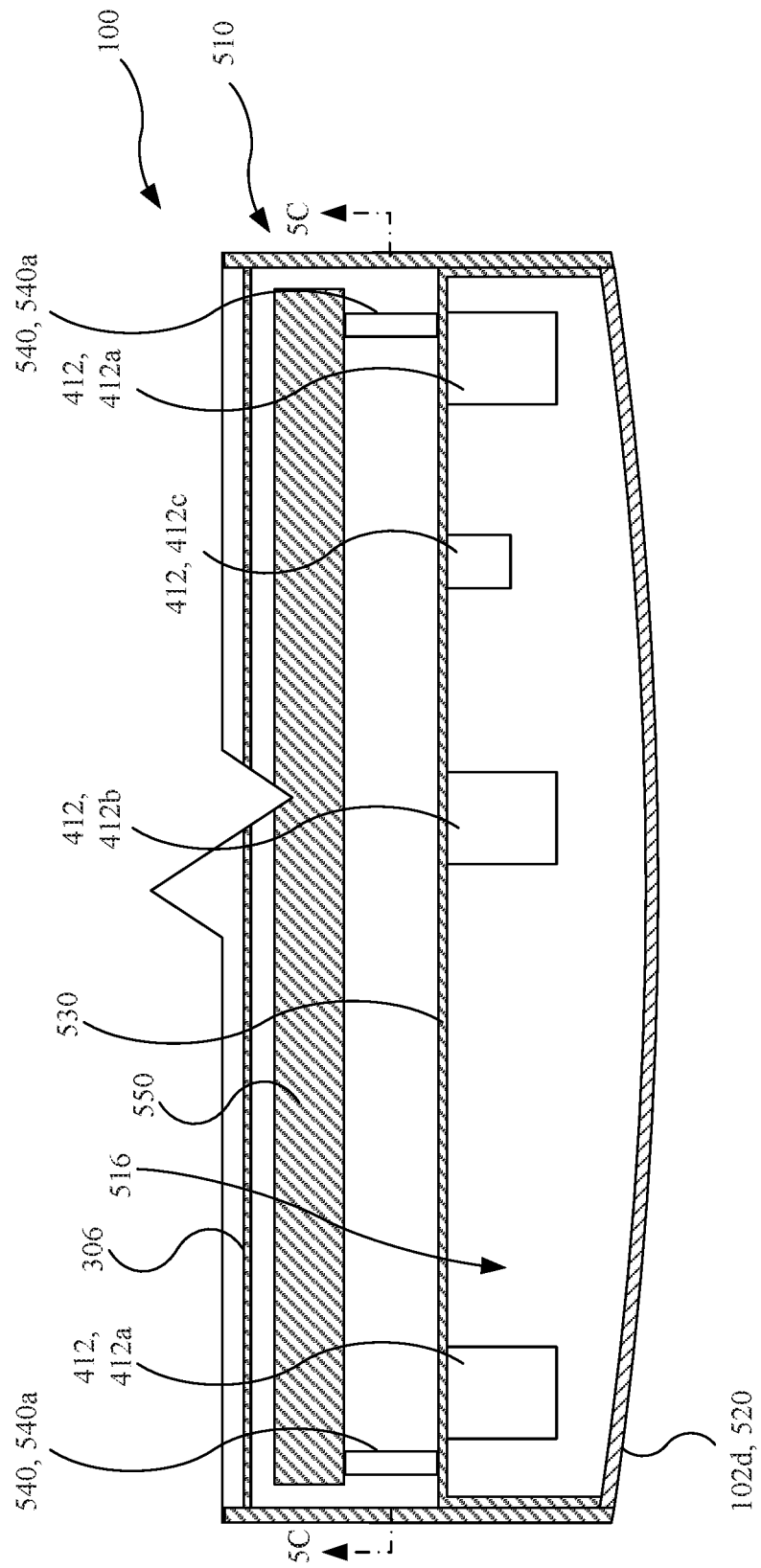
FIG. 5A is a partial cross-sectional view similar to FIG. 4B, which depicts another embodiment of a sensor module in a first configuration.
Figure 5B:
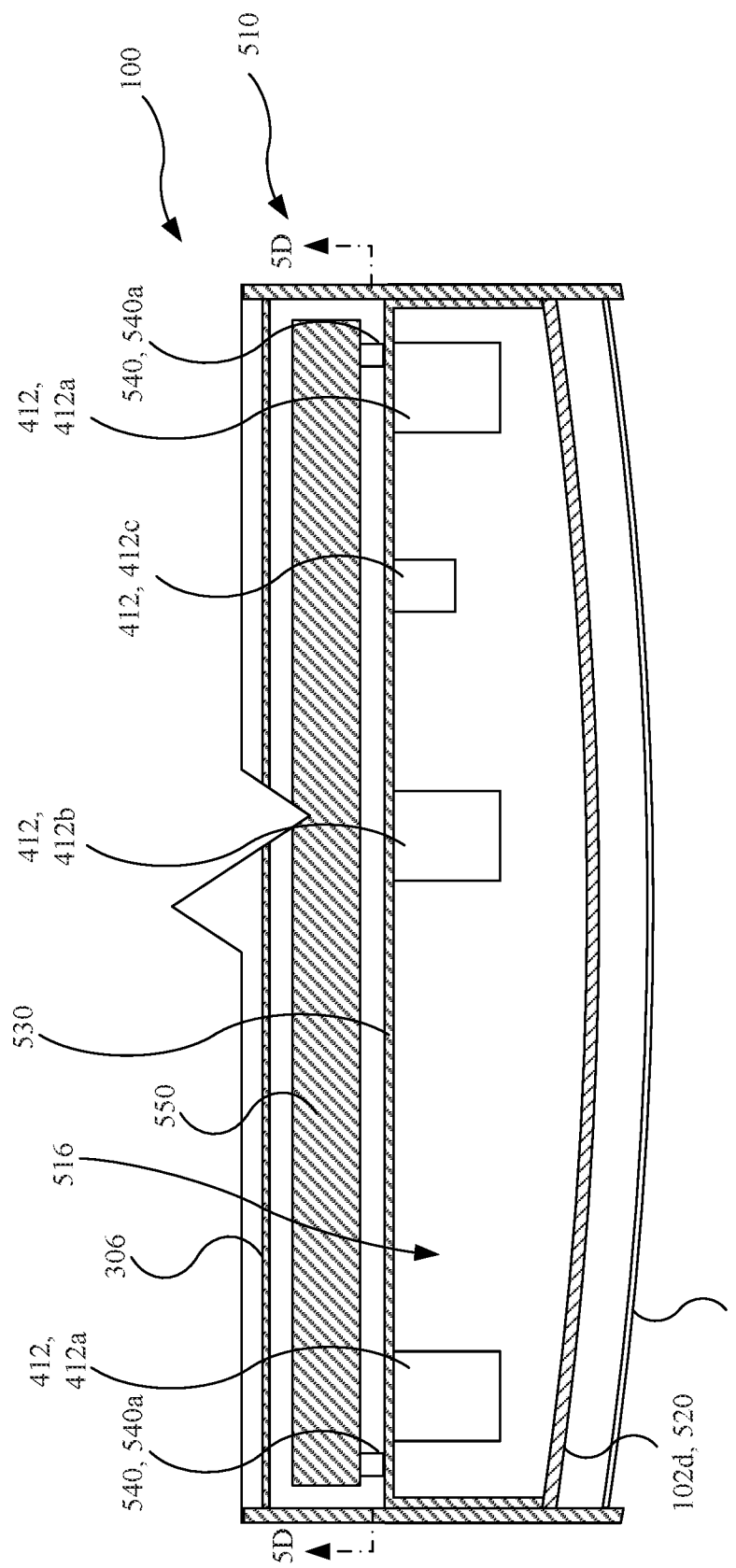
FIG. 5B is another partial cross-sectional view similar to FIG. 5A, which depicts the other embodiment of the sensor module in a second configuration.
Figure 5C:
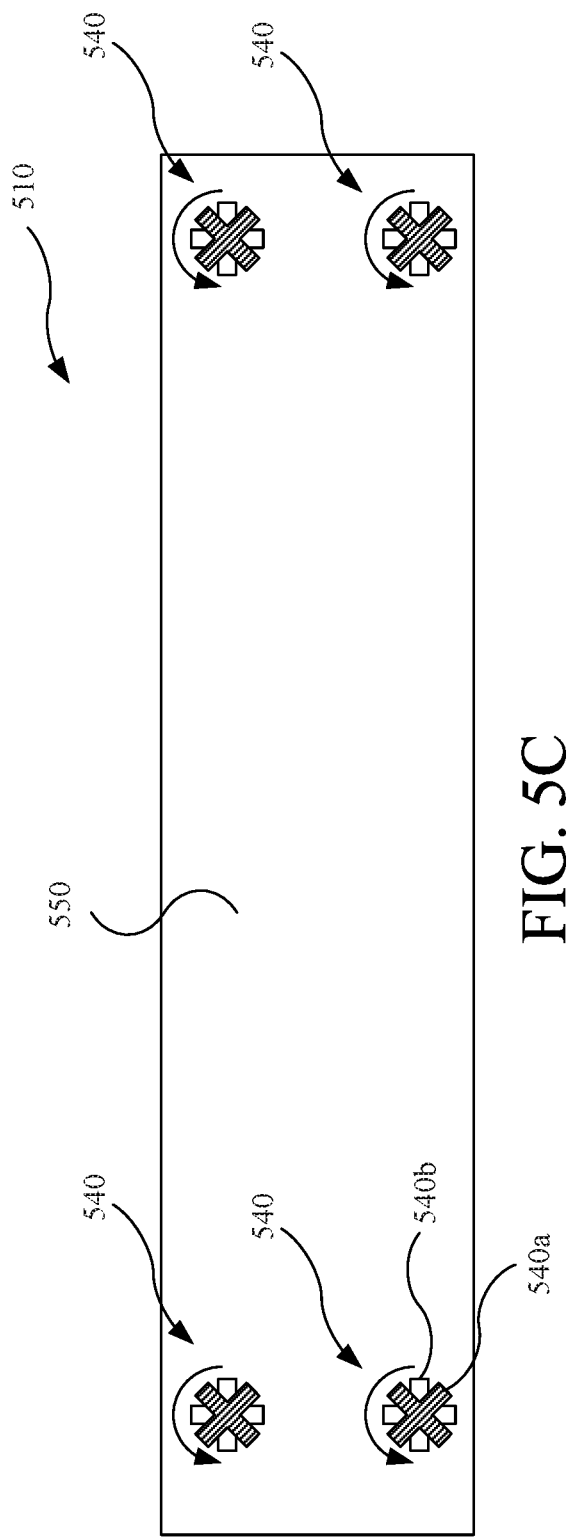
FIG. 5C is a cross-sectional view of the sensor module taken along line 5C-5C in FIG. 5A in the first configuration.
Figure 5D:
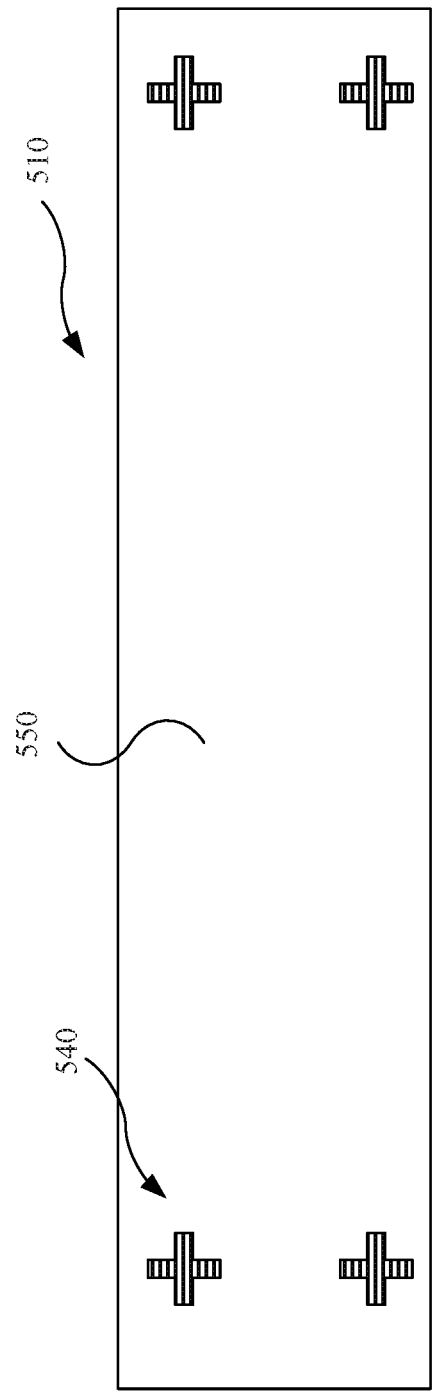
FIG. 5D is a cross-sectional view of the sensor module taken along line 5D-5D in FIG. 5B in the second configuration.
Figure 6A:
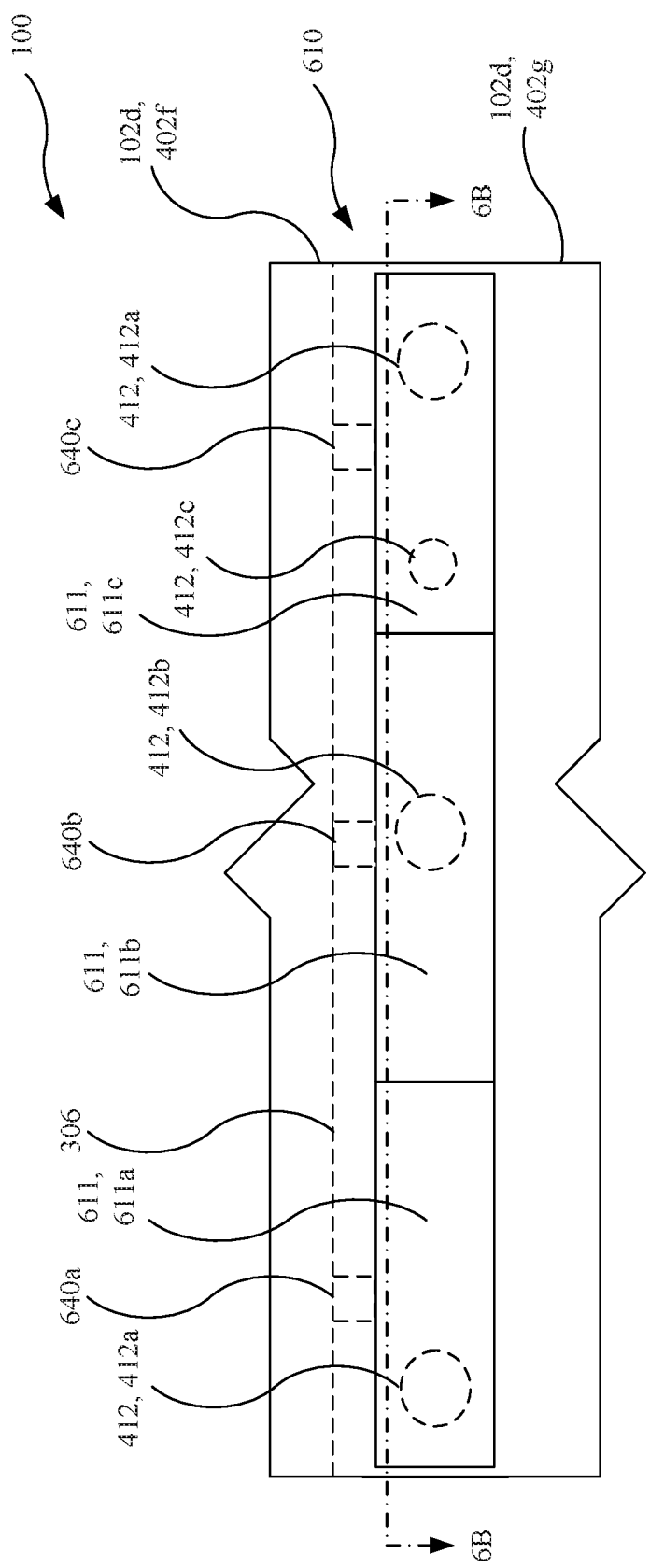
FIG. 6A is a partial front view of the vehicle similar to FIG. 4A, which depicts various internal components of a sensor system in broken lines.
Figure 6B:
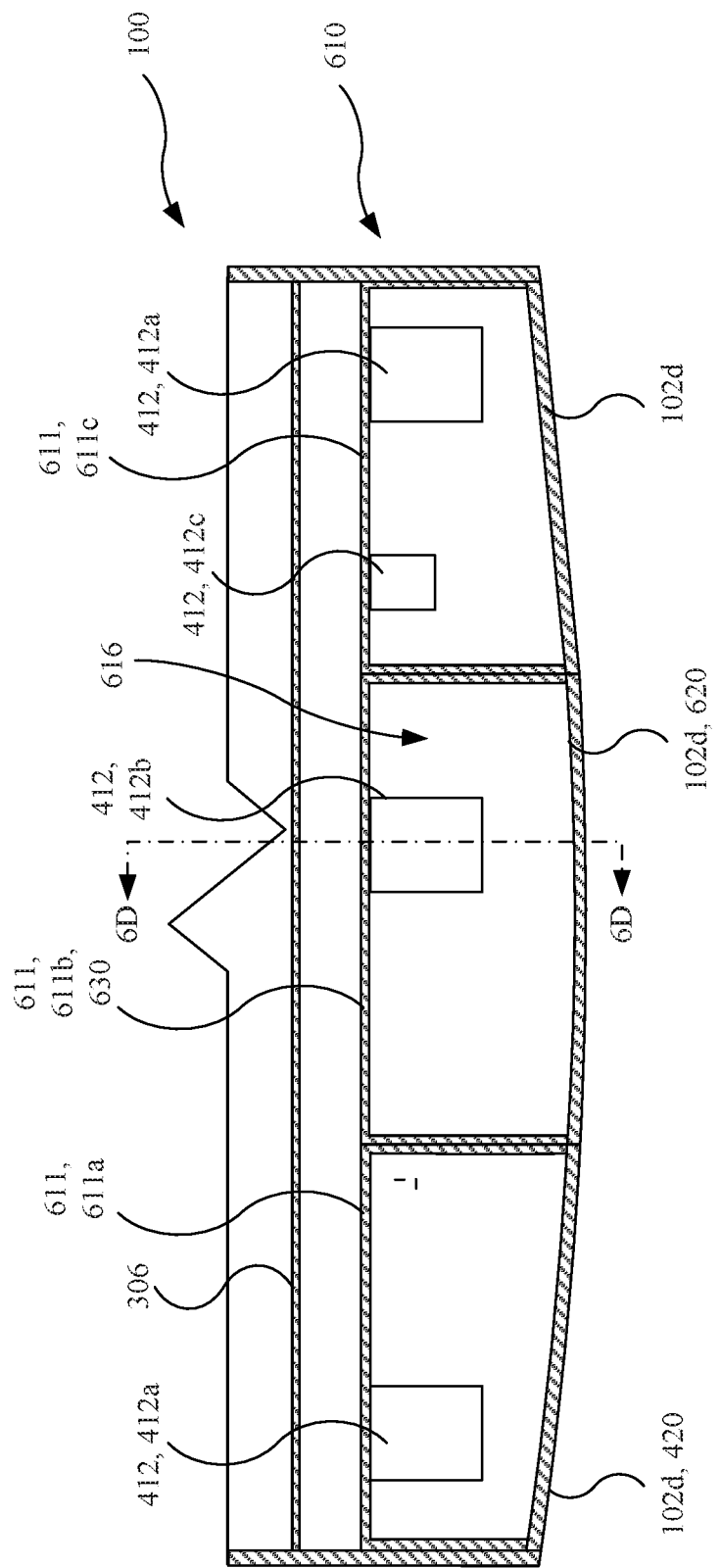
FIG. 6B is a partial cross-sectional view taken along line 6B-6B in FIG. 6A, which depicts a sensor system of the vehicle in a first configuration.
Figure 6C:
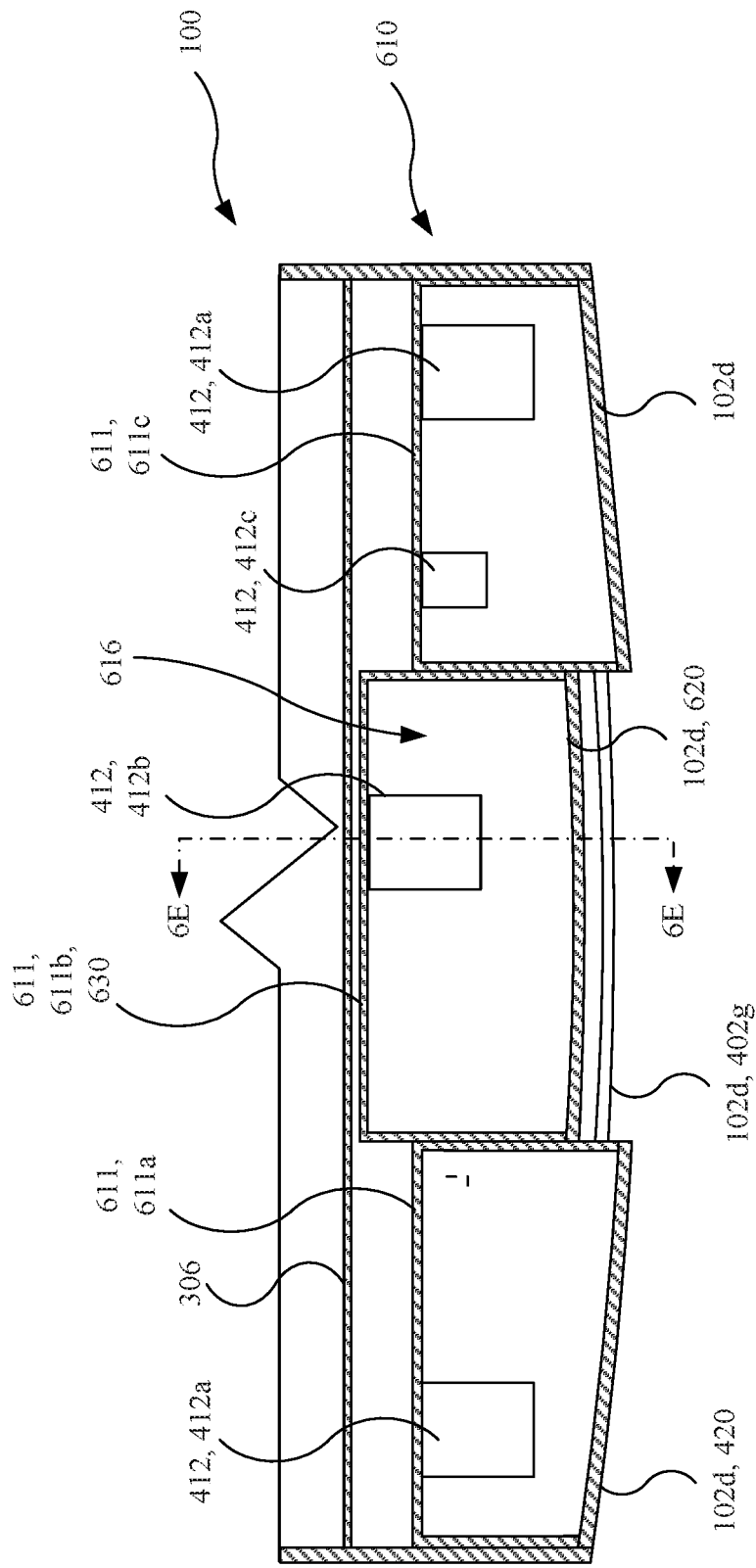
FIG. 6C is a partial cross-sectional view taken along line 6B-6B in FIG. 6A, which depicts the sensor system in a second configuration.
Figure 6D:
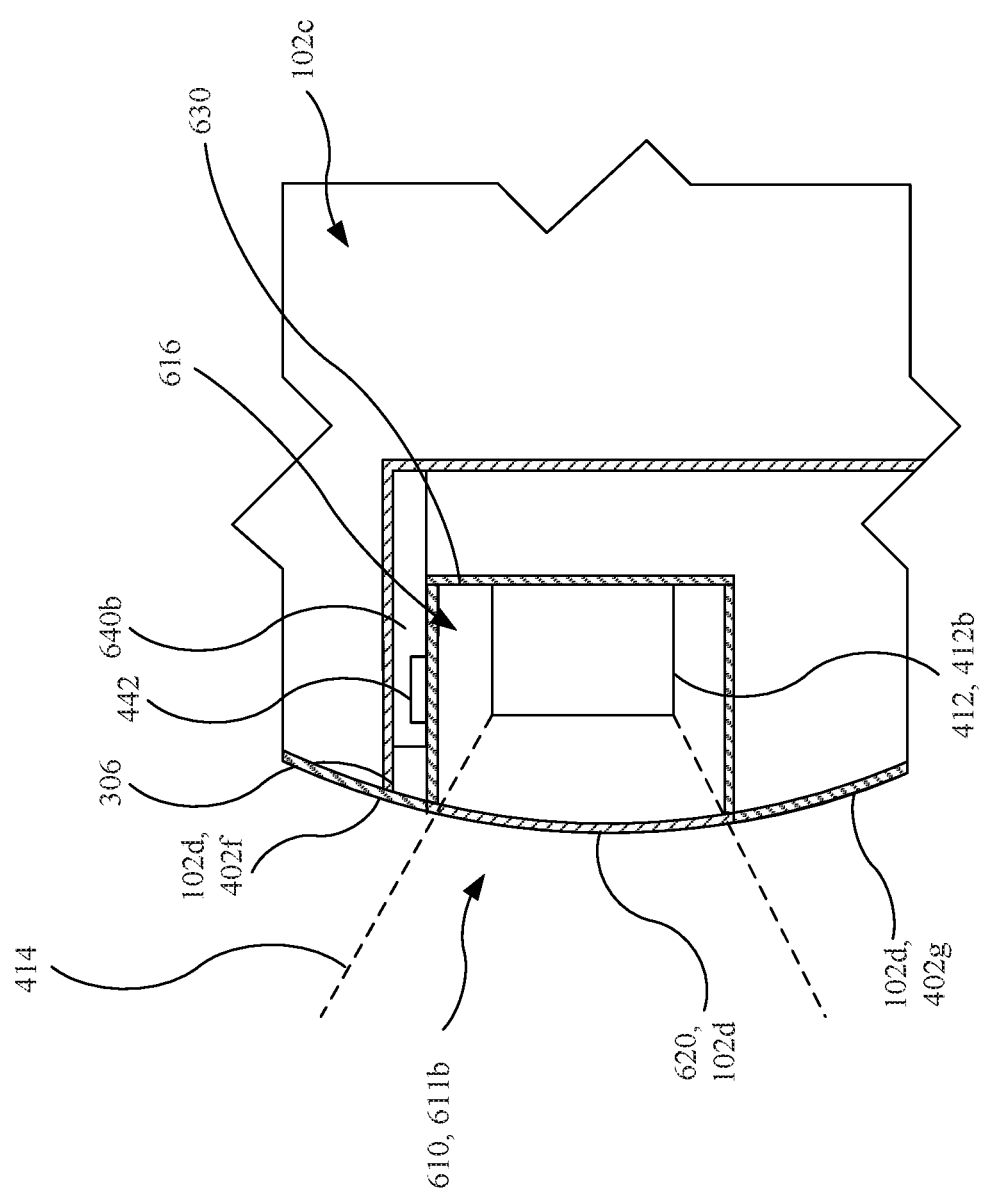
FIG. 6D is a cross-sectional view taken from line 6D-6D in FIG. 6B, which depicts the sensor system in the first configuration.
Figure 6E:
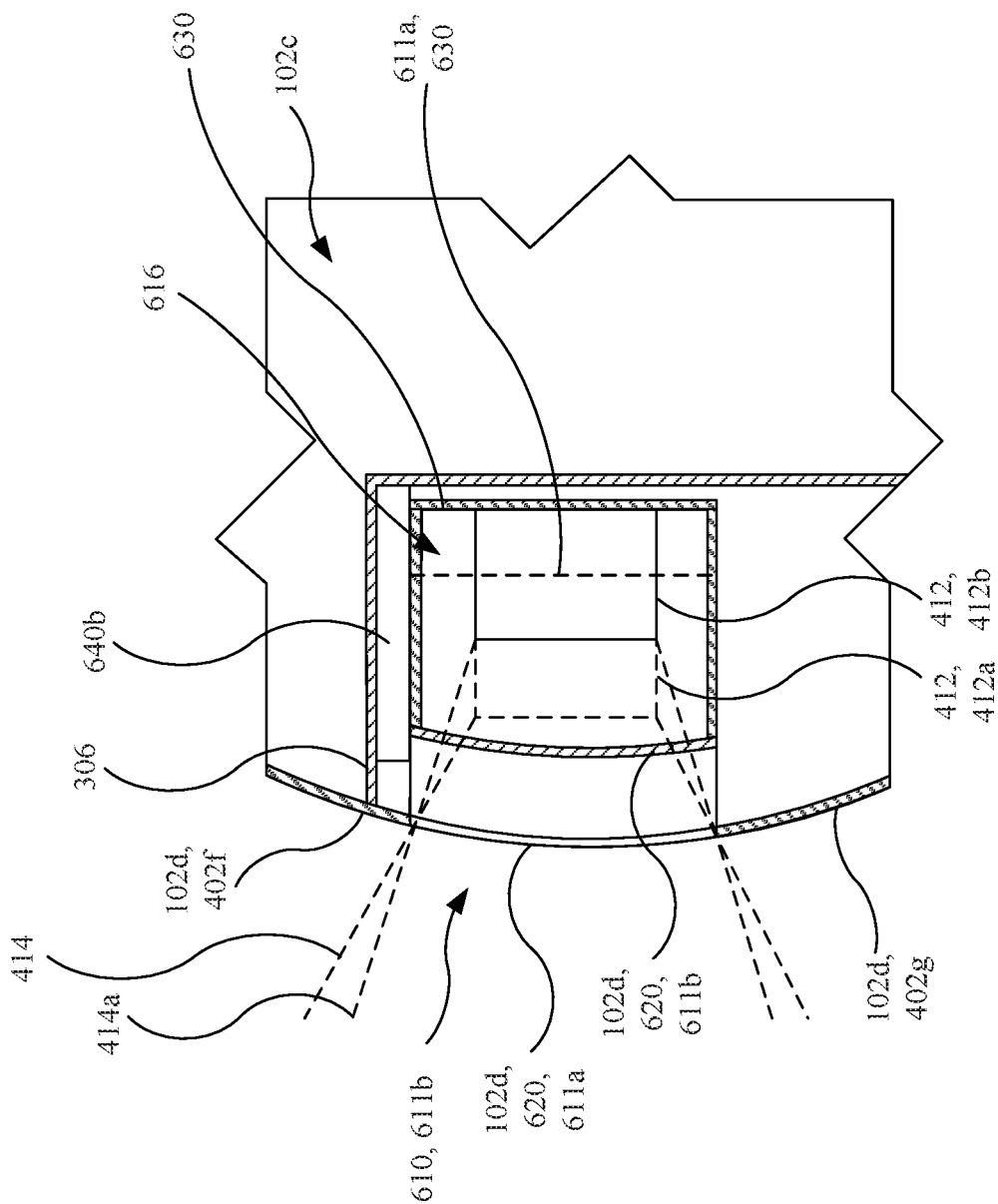
FIG. 6E is a cross-sectional view taken from line 6E-6E in FIG. 6C, which depicts the sensor system in the second configuration.

As shown in FIGS. 4A and 4D-4E, the movement mechanisms 440 are positioned above the inner module structure 430, so as to suspend the sensor module 110 from the inner vehicle structure 306. Alternatively, the movement mechanisms 440 may be arranged in other suitable locations, such as being inward of (e.g., behind; see, e.g., FIGS. 5A-5B), lower than, and/or outboard of the inner module structure 430 and/or sensor module 110 itself.

As discussed below, various different types of movement mechanisms 440 may actively move the sensor module 110 (see, e.g., FIGS. 7A-9B), or allow passive movement of the sensor module 110 due to an external force (see, e.g., FIGS. 10A-11B).

In one embodiment, the one or more movement mechanisms 440 are configured to actively move (e.g., deploy) the sensor module 110 to or toward the second position in response to or in expectation of an impact to the vehicle 100 and/or the sensor module 110. For example, one or more of the movement mechanisms 440 may include a force sensor 442, which detects an amount of force applied by the sensor module 110. Upon detection of a force exceeding a predetermined threshold with the force sensor 442, the movement mechanism 440 moves the sensor module 110 inward along the guide path from the outward position to the inward position. Other types of sensors may be used alone or in conjunction with the force sensor 442 of the movement mechanism 440 to predict, determine, and/or confirm an impact with the sensor module 110, such as the camera 412a, the range sensor 412b, the other sensor 412c, or other sensors (e.g., accelerometers) of the sensor module 110 or the vehicle 100. In another example the movement mechanism 440 may move the sensor module 110 from the outward position to the inward position is response to identifying an elevated risk for an impact, such as when the vehicle 100 is stopped at an intersection.

Figure 9A:
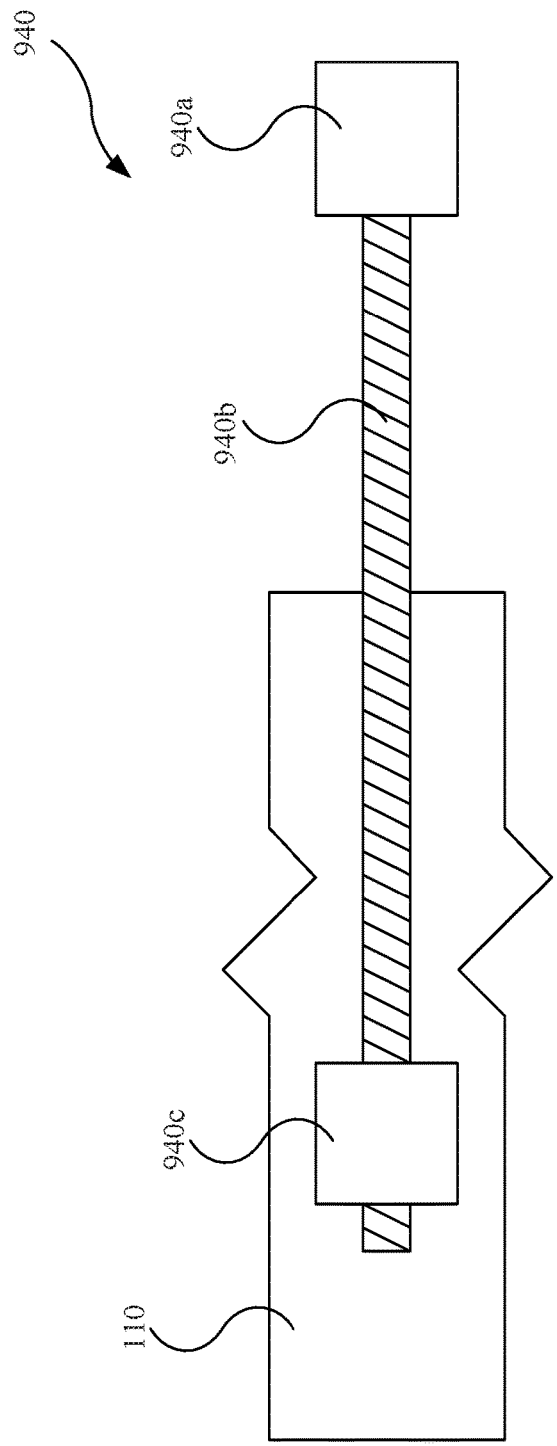
FIG. 9A is a top view of a movement device in a first configuration.
Figure 9B:
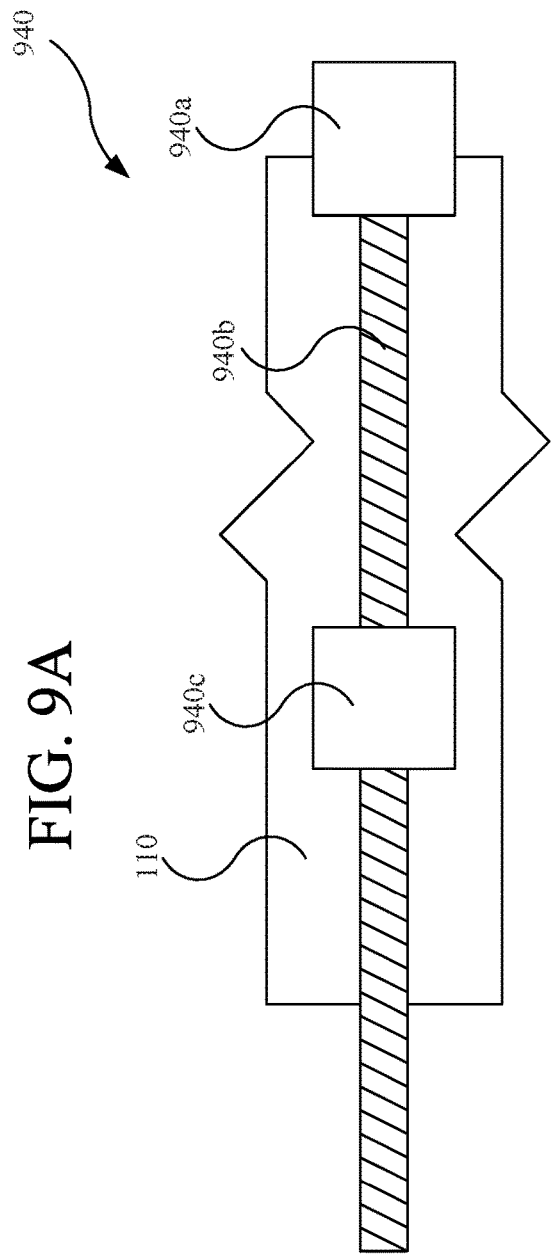
FIG. 9B is a top view of the movement device of FIG. 9A in a second configuration.

To move the sensor module 110, the movement mechanisms 440 may be configured as one or more of an electromechanical device 940, a pneumatic device 1040, and/or a pre-tensioned spring device 1140. As shown in FIGS. 9A-9B, the electromechanical device 940 includes an electric motor 940a, a threaded rod 940b, and a threaded guide 940c coupled to the sensor module 110. As the electric motor 940a rotates the threaded rod 940b, the threaded guide 940c moves therealong to move the sensor module 110 from the outward position (shown in FIG. 9A) to the inward position (shown in FIG. 9B). Instead or additionally, the electromechanical device 940 may include a linkage system and/or cable system. The electromechanical device 940 may also be configured to move the sensor module 110 from the inward position back to or toward the outward position.

Figure 10A:
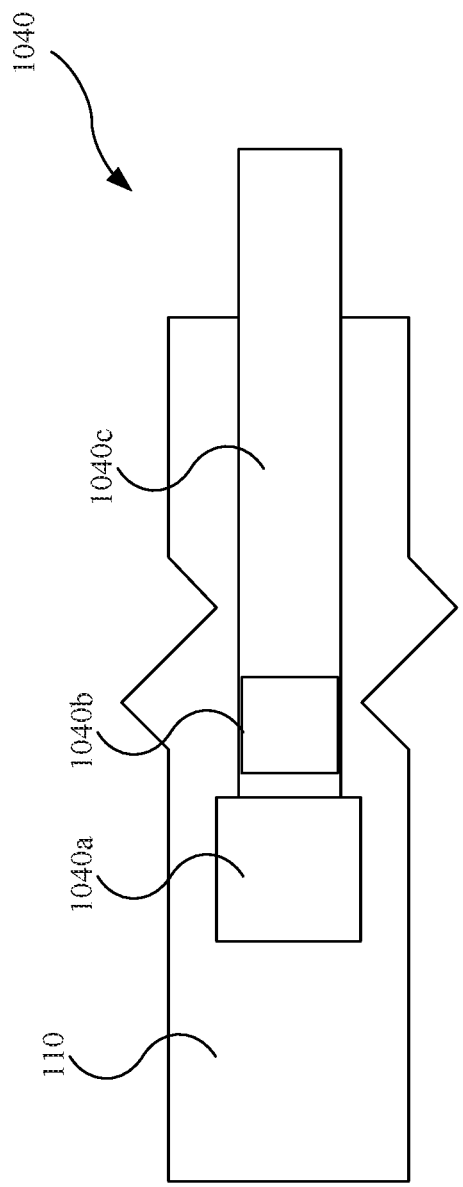
FIG. 10A is a top view of another movement device in a first configuration.
Figure 10B:
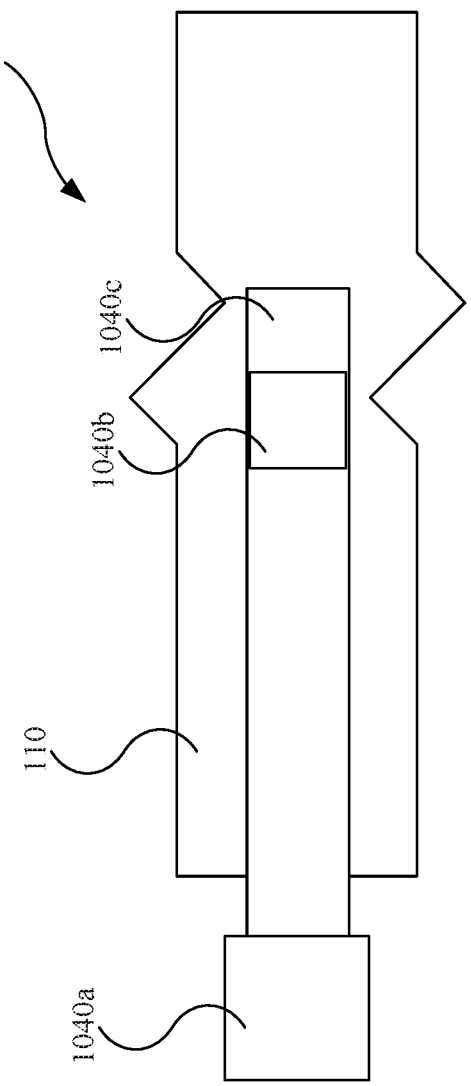
FIG. 10B is a top view of the movement device of FIG. 10A in a second configuration.

As shown in FIGS. 10A-10B, the pneumatic device 1040 may include a pyrotechnic 1040a, or other pressurized gas source or vacuum source, that supplies a pressurized gas (or vacuum) to move a piston 1040b coupled to the sensor module 110 within a cylinder 1040c, and thereby move the sensor module 110 from the outward position (shown in FIG. 10A) to the inward position (shown in FIG. 10B). As shown in FIGS. 11A-11B, the pre-tensioned spring device 1140 includes a spring 1140a that is coupled to the sensor module 110, and is held in tension (as shown in FIG. 11A) until being selectively released by an actuator 1140b (e.g., latch) to move the sensor module 110 to the inward position (shown in FIG. 11B). With movement mechanisms 440 incorporating only the pneumatic devices 1040 or the pre-tensioned spring devices 1140, the sensor module 110 may be movable only from the outward position to the inward position.

Figure 12A:
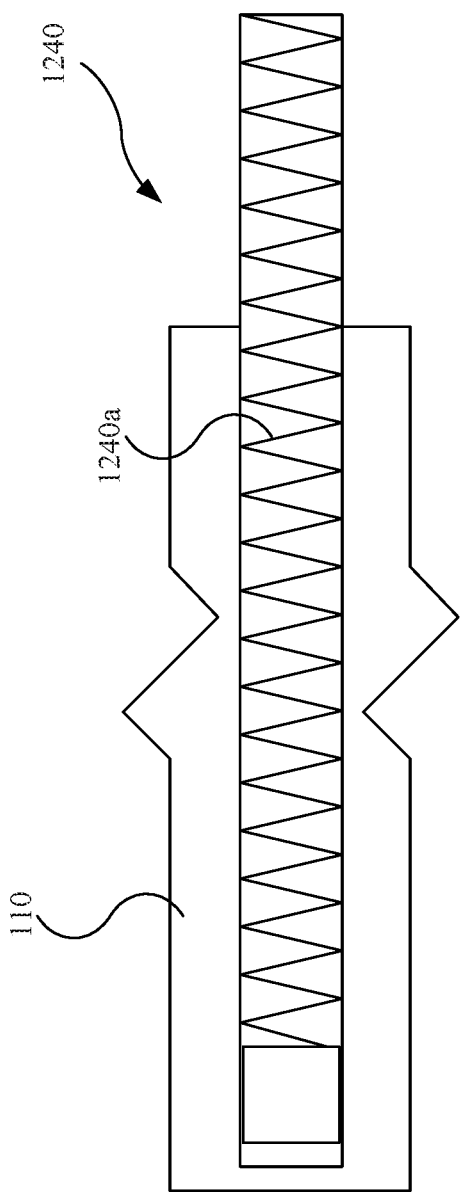
FIG. 12A is a top view of another movement device in a first configuration.
Figure 12B:
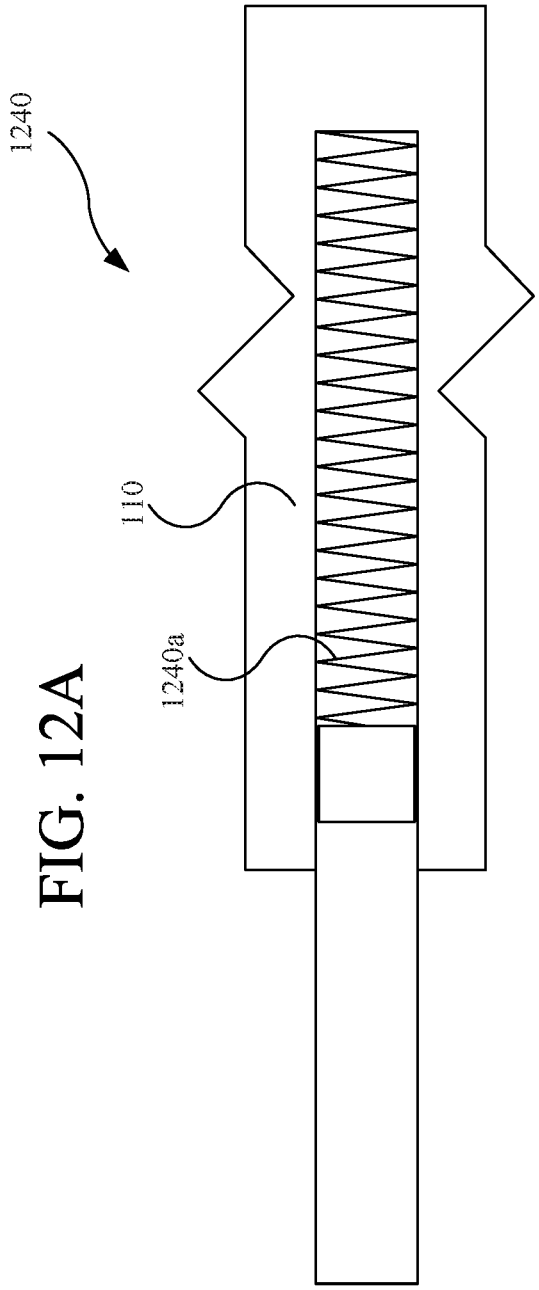
FIG. 12B is a top view of the movement device of FIG. 12A in a second configuration.

In another embodiment, the one or more movement mechanisms 440 are configured to allow passive movement of the sensor module 110 to or toward the second position. In some implementations, passive movement of the sensor module 110 is implemented using resilient biasing structures such as springs. For example, as shown in FIGS. 12A-12B, the one or more movement mechanism 440 may be configured as a pre-compressed spring device 1240 having a spring 1240a (e.g., coil spring) that is pre-compressed (as shown in FIG. 12A) to maintain the sensor module 110 in the outward position during normal operation. Upon application of sufficient force (e.g., 4 kN) to the sensor module 110, the spring 1240a is further compressed to allow movement of the sensor module 110 from the outward position (shown in FIG. 12A) to the inward position (shown in FIG. 12B). The spring 1240a applies a force against the sensor module 110 (e.g., constant at approximately 4 kN) over the guide path from the outward position to the inward position, so as to absorb energy from the source of the impact (e.g., other vehicle or pedestrian to improve pedestrian protection performance). To transfer the force from the impact to the movement mechanisms, the sensor module 110 is configured to be substantially rigid and not deform under relatively low magnitude impacts (e.g., impacts with pedestrians or low speed impacts with other vehicles, such as 2-4 mph). Once the force of the impact is removed, the movement mechanisms 440 press the sensor module 110 back towards its outward position as permitted by surrounding vehicle structures that have not been deformed. In other embodiments, the movement mechanisms 440 may be configured with an air spring or electromechanical device to allow passive movement and/or to absorb energy from an impact.

Referring to FIGS. 5A-5D, a sensor module 510 includes movement mechanisms 540 that are selectively controlled to allow passive movement of the sensor module 510. The movement mechanisms 540 can be initially disposed in a locked position, in which passive movement of the sensor module 510 is restrained, and the movement mechanisms 540 can be moved to an unlocked position, in which passive movement of the sensor module 510 is allowed, in response to a signal, such as a signal indicating an actual or expected impact. The sensor module 510 generally includes an outer module structure 520, an inner module structure 530, the movement mechanisms 540, and a base structure 550. The outer module structure 520 and the inner module structure 530 cooperatively define an internal region 516 (e.g., void, cavity, housing, etc.) in which one or more of the sensors 412 are positioned and coupled to the inner module structure 530. The inner module structure 530 is, in turn, mounted to the base structure 550 via one or more of the movement mechanisms 540, which extend from a rear of the inner module structure 530 to the base structure 550. The base structure 550 is fixedly coupled to or held in fixed relation to the inner vehicle structure 306.

Upon detection or expectation of an impact of a sufficient magnitude (e.g., using the sensors 412 or other sensors of the vehicle 100, the sensor module 510, or the movement mechanism 540), the movement mechanisms 540 are actuated to allow movement of the inner module structure 530, along with the sensors 412 and the outer module structure 520, from the outward position to or toward the inward position (e.g., due to force from the impact). The movement mechanisms 540 each include a shaft 540a that is selectively received within an aperture 540b in the base structure 550. More particularly, the shafts 540a have a cross-sectional shape corresponding to that of the apertures 540b that require rotational alignment of the shafts 540a with the apertures 540b for receipt therein (e.g., having an X-shape as shown). During normal operation, the shafts 540a bear against an outward surface of the base structure 550 (see FIG. 5C) to form a rigid assembly. Upon detection or expectation of an impact, the shafts 540a are rotated (e.g., actuated) into alignment therewith. When aligned, the shafts 540a are receivable within the apertures 540b, thereby allowing the sensor module 510 to move from the outward position to the inward position.

In still further embodiments, the various embodiments of the sensor module 110 (or alternative sensor modules or systems disclosed herein (e.g., 510, 610, etc.)) are configured to move and/or absorb energy in different manners. For example, the respective outer structures, inner structures, and movement mechanisms may be configured deform in predetermined manners in response to impacts therewith. The various embodiments of the sensor module 110 may instead or additionally include other frangible or deformable features, such as the movement mechanisms 440 including frangible elements that allow movement or release upon application of a predetermined force to the sensor module 110 and/or by mounting the sensor module 110 or sensors 412 via deformable rods (e.g., instead of or in addition to movement mechanisms 540 behind the sensors 412).

Referring to FIGS. 6A-6E, the vehicle 100 instead includes a sensor system 610. The sensor system 610, rather than being movable as a single unit, includes multiple sensor submodules 611 that cooperatively span a width, or a portion of the width, of the vehicle 100. For example, the sensor system 610 may include three sensor submodules 611, such as a right sensor submodule 611a, a middle sensor submodule 611b, and a left sensor submodule 611c, which are independently movable. Providing the sensor system 610 with multiple sensor submodules 611 may, for example, be advantageous when using movement mechanisms 440 configured as a pre-compressed spring device 1240 to more granularly control the force applied by the sensor submodules 611 to the source of the impact. The sensor submodules 611 may be separately coupled to the inner vehicle structure 306 via the movement mechanism 440 (as shown), or may be coupled to each other, such as to a common housing or a frame, which is in turn coupled to the inner vehicle structure 306.

Each of the sensor submodules 611 is functionally and structurally configured similar to the sensor module 110. The sensors 412 of the sensor submodules 611 are recessed within the vehicle body 102 of the vehicle 100. Each sensor submodule 611 includes an outer module structure 620 and an inner module structure 630, which cooperatively define an interior module region 616 in which is positioned one or more of the sensors 412. For further details of the outer module structure 620 and the inner module structure 630, refer to the discussion of the outer module structure 420 and the inner module structure 430 above.

The sensor submodules 611 are each movable from respective outward positions (shown in FIGS. 6B and 6D) to respective inward positions (see the middle sensor submodule 611b in FIGS. 6C and 6E) in response to or otherwise as a result of an impact or expected impact therewith. More particularly, the right sensor submodule 611a, the middle sensor submodule 611b, and the left sensor submodule 611c are movably mounted to the inner vehicle structure 306 with a right movement mechanism 640a, a middle movement mechanism 640b, and a left movement mechanism 640c, respectively. For further details of the movement mechanisms, refer to the discussion above of the movement mechanisms 440, the movement mechanisms 540, and the various configurations thereof (e.g., type and mounting location).

Figure 7A:
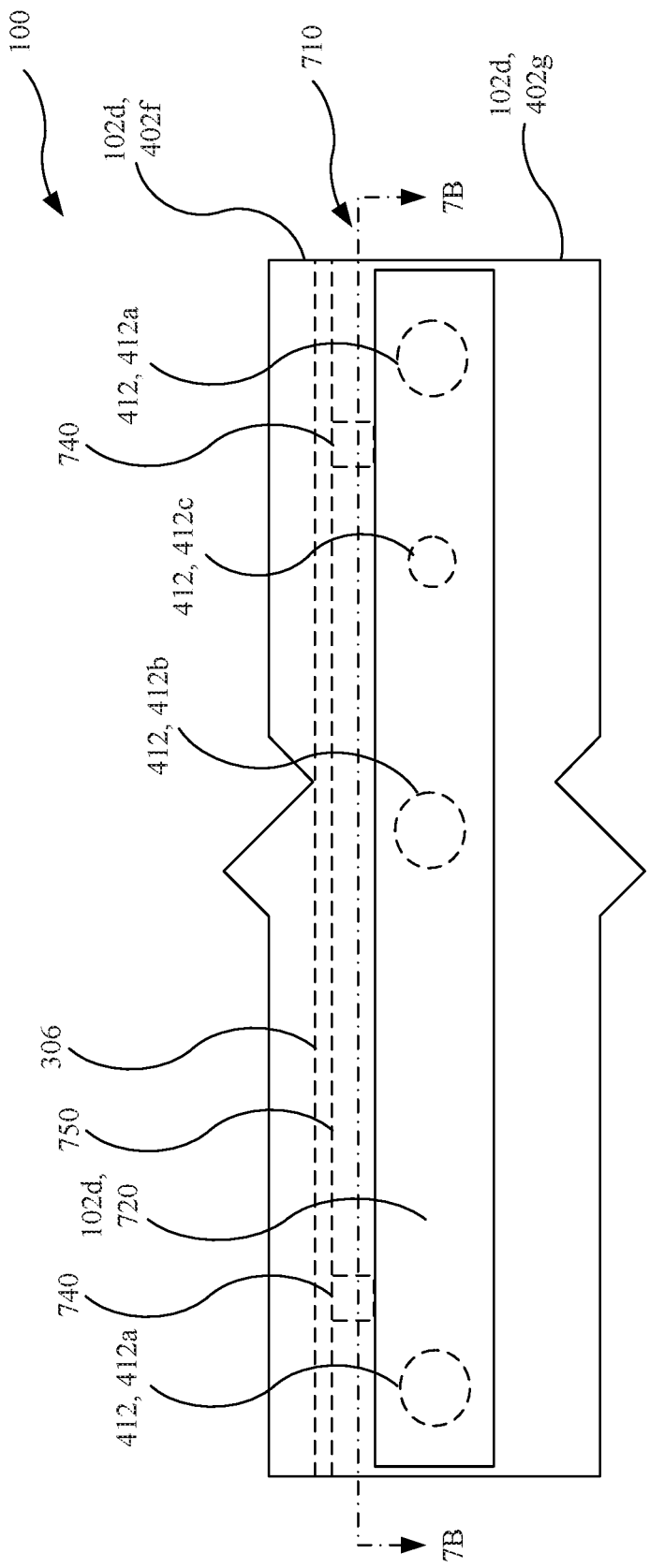
FIG. 7A is a partial front view of the vehicle shown in FIG. 1 with hidden components of another sensor module depicted in broken lines.
Figure 7B:
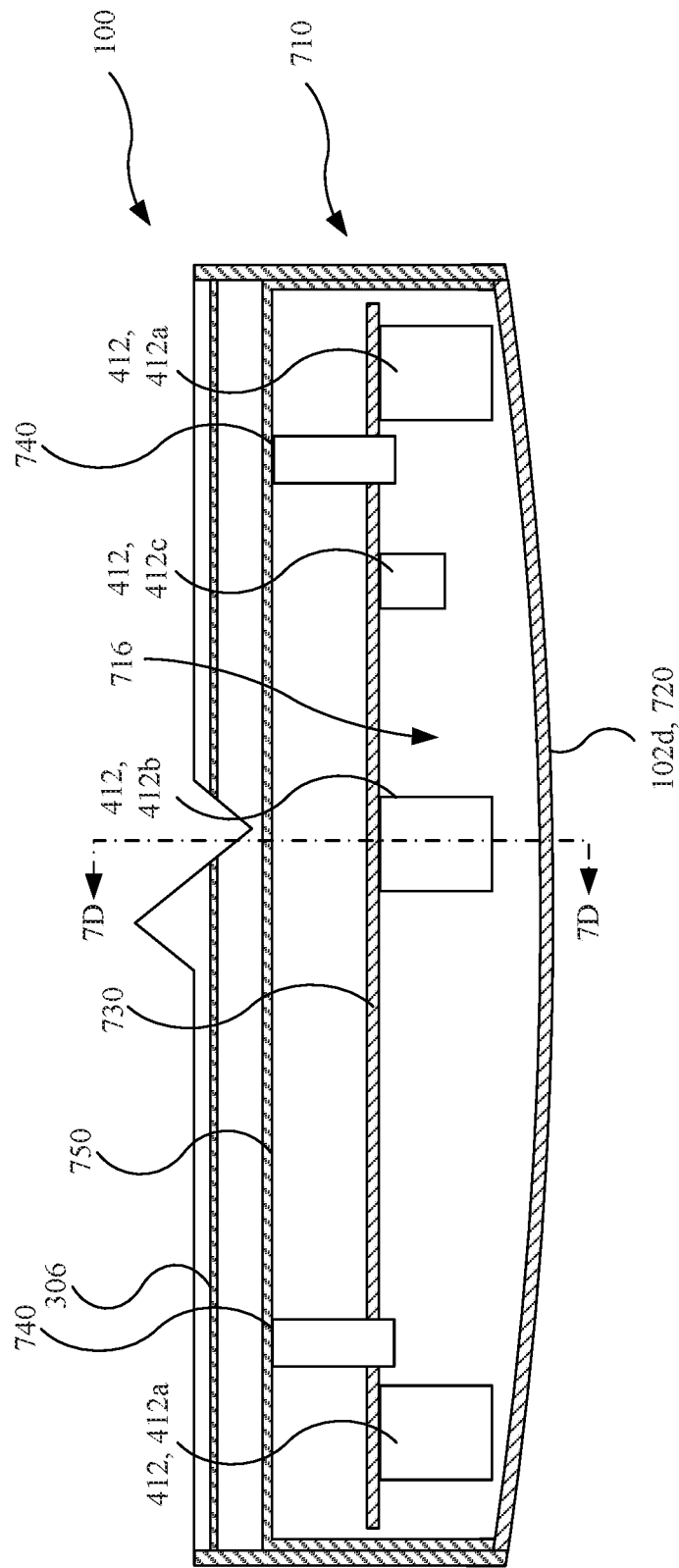
FIG. 7B is a partial cross-sectional view taken along line 7B-7B in FIG. 7A, which depicts the sensor module of the vehicle in a first configuration.
Figure 7D:
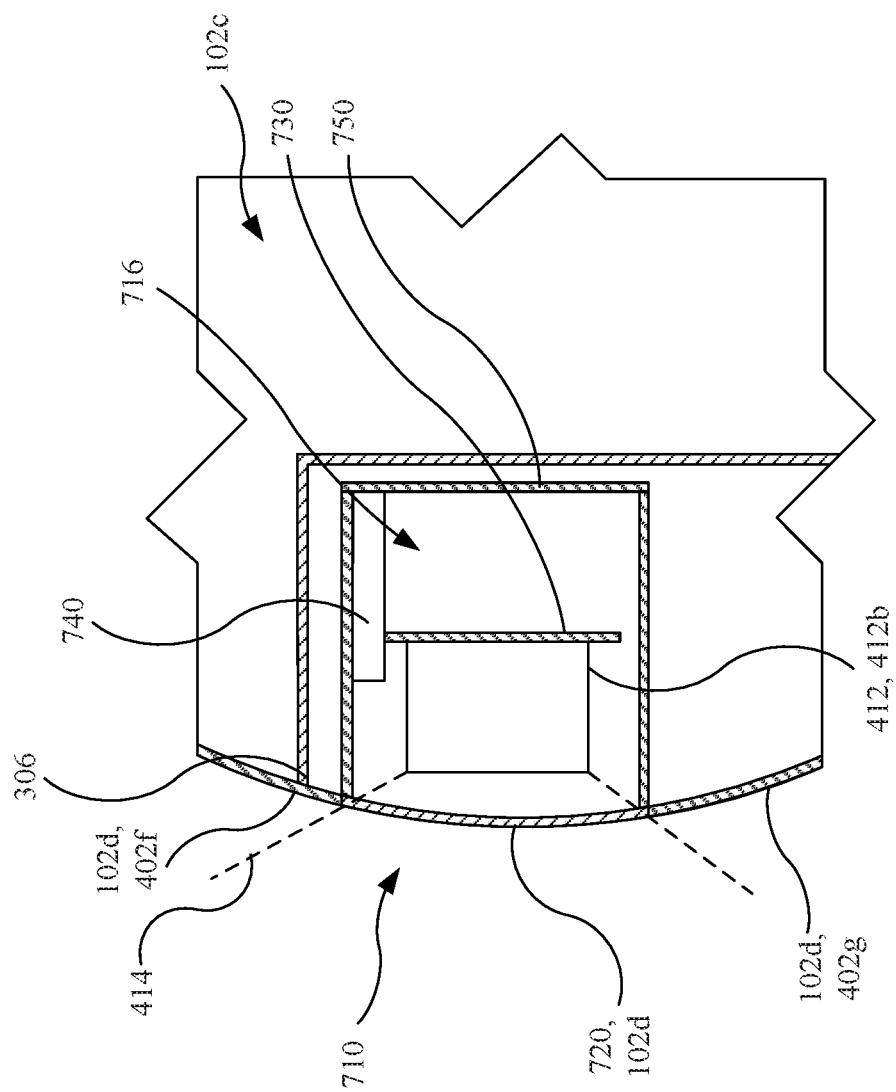
FIG. 7D is a cross-sectional view taken along line 7D-7D in FIG. 7B, which depicts the sensor module in the first configuration.

Referring to FIGS. 7A-7E, a sensor module 710 includes sensors 412 that are movable within the sensor module 710 from an outward position (shown in FIG. 7B) to an inward position (shown in FIG. 7C). By moving the sensors 412 within the sensor module 710, the sensors 412 may be moved away from an impact to prevent damage thereto, while other portions of the sensor module 710 may be deformed to absorb energy from an impact in a controlled manner (e.g., to improve pedestrian protection performance).

The sensor module 710 generally includes an outer module structure 720, an inner movable structure 730, one or more movement mechanisms 740, and a base structure 750 (e.g., casing structure). The outer module structure 720 and the base structure 750 cooperatively define an internal region 716 (e.g., void, cavity, housing, etc.) in which is positioned the inner movable structure 730 with one or more of the sensors 412 coupled thereto.

More particularly, the inner movable structure 730 is movably coupled to the base structure 750 by the movement mechanisms 740, while the base structure 750 and the outer module structure 720 are fixedly coupled (directly or indirectly) to the inner vehicle structure 306 of the vehicle 100. The outer module structure 720 may form a portion of the outer surface 102d of the vehicle body 102, and may, in conjunction with other portions of the vehicle 100 (e.g., the upper body panel 402f and the lower body panel 402g) and/or the base structure 750 function to enclose or seal sensors 412 within the internal region 716.

Upon detection or expectation of an impact of a sufficient magnitude (e.g., using the sensors 412 or other sensors of the vehicle 100 or the sensor module 710), the movement mechanisms 740 are actuated to actively move the inner movable structure 730, and the sensors 412 coupled thereto, from the outward position (e.g., outward module position and outward sensor positions) to or toward the inward position (e.g., inward module position and inward sensor positions). The movement mechanisms 740 may be configured to include one or more of the active movement mechanisms described above (e.g., the electromechanical device 940, the pneumatic device 1040, and/or the pre-tensioned spring device 1140).

Figure 7E:
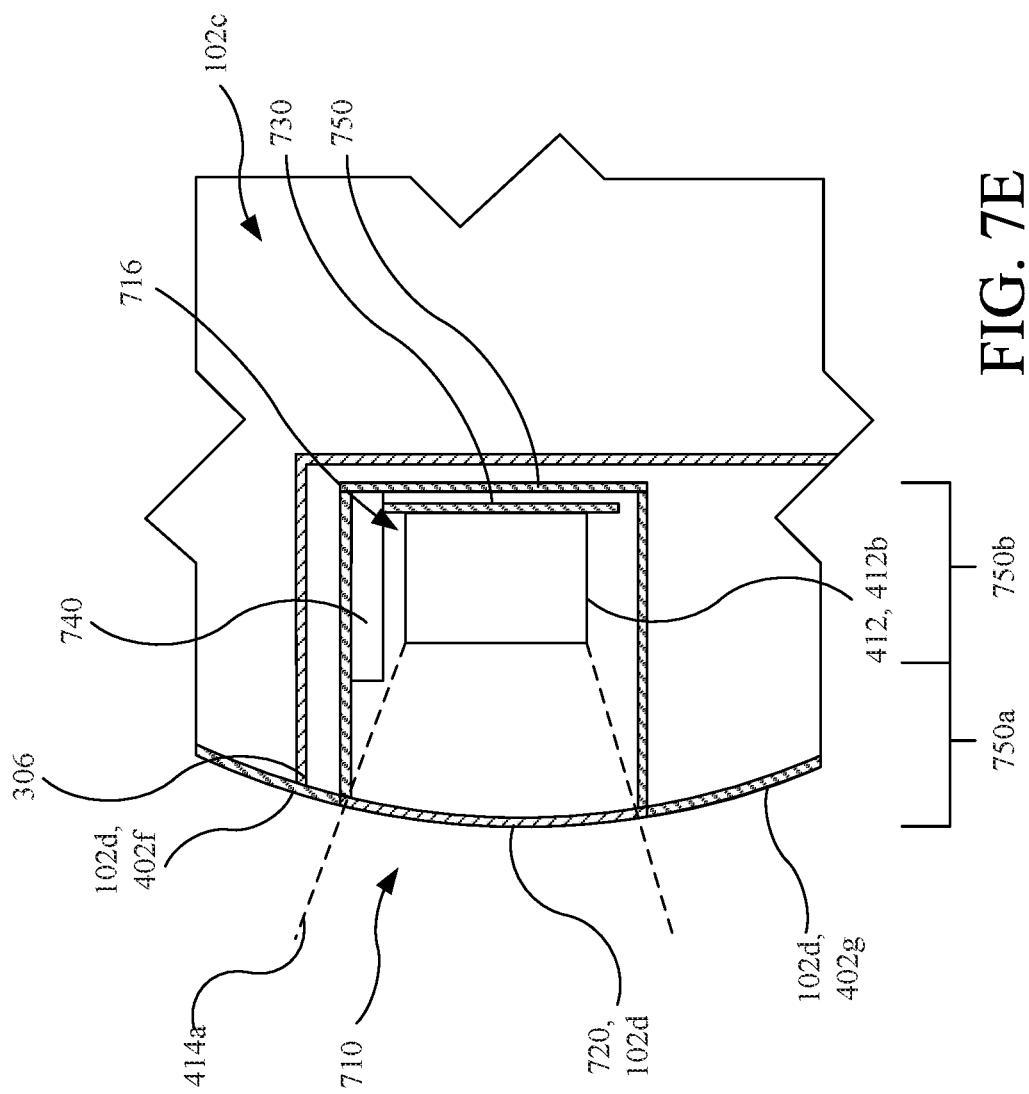
FIG. 7E is a cross-sectional view taken along line 7E-7E in FIG. 7C, which depicts the sensor module in the second configuration.

Furthermore, the base structure 750 is configured to deform to absorb energy from an impact. For example, as shown in FIG. 7E, the base structure 750 may include an outward portion 750a (e.g., deformable portion) and an inward portion 750b (e.g., rigid portion). The outward portion 750a is configured to deform in a controlled manner upon impact therewith to absorb energy, while the inward portion 750b is stronger (e.g., stiffer, more rigid, etc.) than the outward portion 750a, so as to protect the sensors 412 surrounded thereby when in their respective inward positions.

Figure 8A:
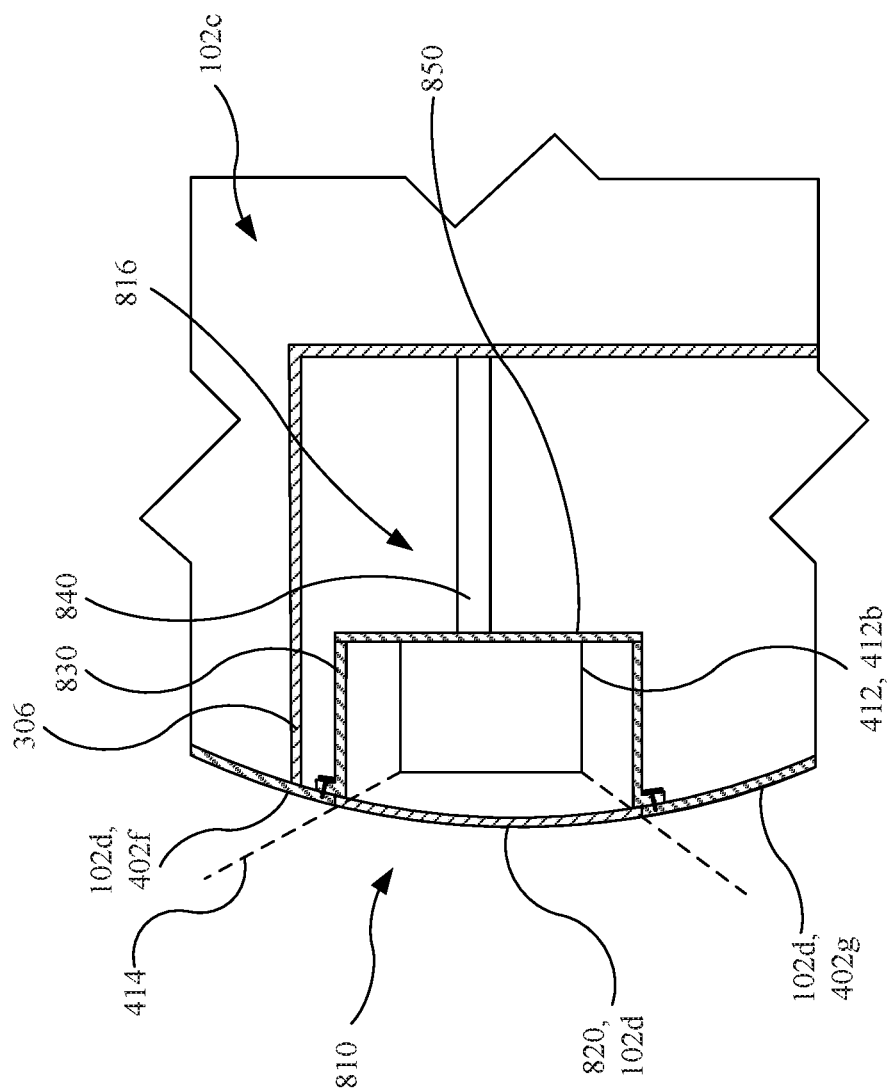
FIG. 8A is a cross-sectional view of another sensor system in a first configuration.
Figure 8B:
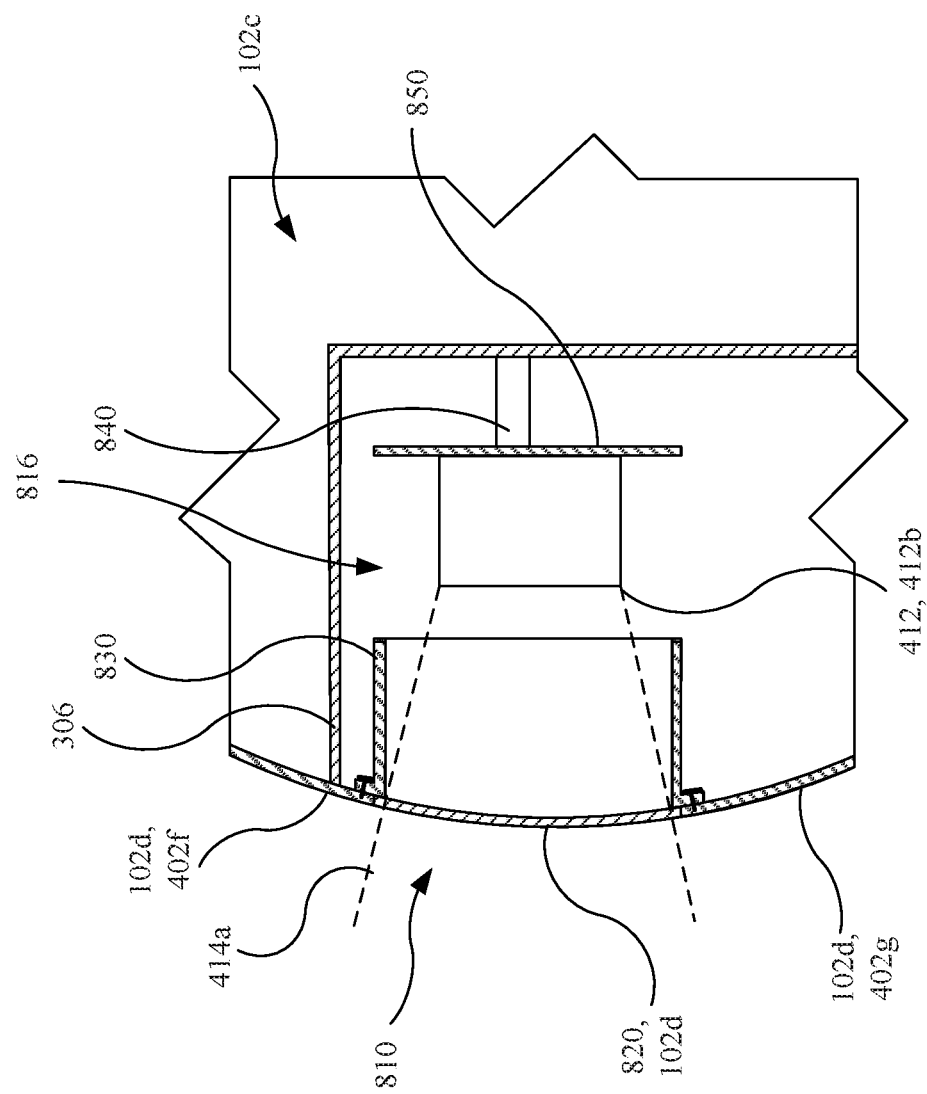
FIG. 8B is another cross-sectional view of the sensor system of FIG. 8A in a second configuration.

Referring to FIGS. 8A-8B, a sensor system 810 includes sensors 412 that are movable relative to an outer structure 820 and an inner casing structure 830 of the sensor system 810. More particularly, the sensors 412 are coupled to an inner movable structure 850 (e.g., plate), which is moved via one or more movement mechanisms 840 from the outward position (shown in FIG. 8A) to the inward position (shown in FIG. 8B). This movement allows the outer structure 820 and the inner casing structure 830 to deform to absorb energy from an impact, while still protecting the sensors 412 from damage.

The outer structure 820, the inner casing structure 830, and the inner movable structure 850 cooperatively define an internal region 816 (e.g., void, cavity, housing, etc.) that contains the sensors 412 when in the outward position. The outer structure 820 and the inner casing structure 830 are fixedly coupled to each other and to the vehicle body 102. The outer structure 820 forms a portion of the outer surface 102d of the vehicle 100, and allows particular wave types to pass therethrough to the sensors 412, as described previously. The inner casing structure 830 extends inward from the outer structure 820 to an inward open end thereof, and substantially surround the sensors 412 (e.g., above, below, and on outboard sides thereof) when in their outward positions.

The inner movable structure 850 is configured to be moved by the one or more movement mechanisms 840 from the outward position to the inward position. The movement mechanisms 840 may, along with the inner movable structure 850 and the sensors 412, form a subassembly that is coupled to the inner vehicle structure 306 separate from the outer structure 820 and the inner casing structure 830 (or another subassembly formed thereby).

Upon detection or expectation of an impact of a sufficient magnitude (e.g., using the sensors 412 or other sensors of the vehicle 100 or the sensor system 810), the movement mechanisms 840 are actuated to actively move the inner movable structure 850, and the sensors 412 coupled thereto, from the outward position (e.g., outward module position and outward sensor positions) to or toward the inward position (e.g., inward module position and inward sensor positions). In the outward position, the inner movable structure 850 engages the inward end of the inner casing structure 830, so as to position and enclose the sensors 412 in the internal region 816 of the sensor system 810. In the inward position, the inner movable structure 850 is biased away from the inward end of the inner casing structure 830. The movement mechanisms 840 may be configured to include one or more of the active movement mechanisms described above (e.g., the electromechanical device 940, the pneumatic device 1040, and/or the pre-tensioned spring device 1140).

Figure 13A:
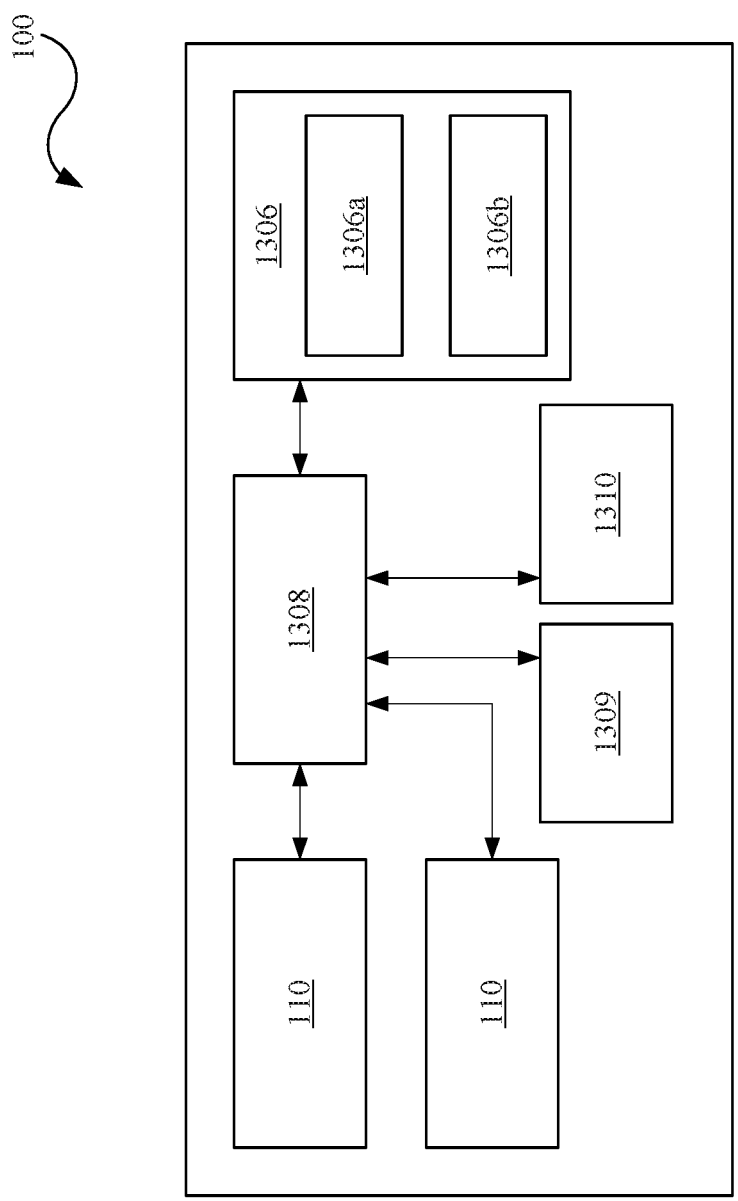
FIG. 13A is a schematic view of the vehicle shown in FIG. 1.

Referring to FIG. 13A, the vehicle 100 additionally includes a drivetrain 1306, a controller 1308, and one or more additional sensors 1310 (e.g., accelerometers). The drivetrain 1306 is configured to propel and steer the vehicle 100. The drivetrain 1306 may be an electric drivetrain, which generally includes one or more electric motors 1306a and one or more batteries 1306b, which supply electric power to the electric motors 1306a for rotating wheels of the vehicle 100 to propel the vehicle 100. The controller 1308 is in communication with the sensors of the sensor modules 110, the drivetrain 1306, and other systems 1309 of the vehicle 100 (e.g., heating/cooling, navigation, infotainment, etc.). According to other embodiments, the vehicle 100 may include a fuel-based powertrain (e.g., gasoline, diesel, hydrogen, etc.), or a hybrid (e.g., series or parallel) powertrain that uses a combination of electric and fuel-based powertrains.

Figure 13B:
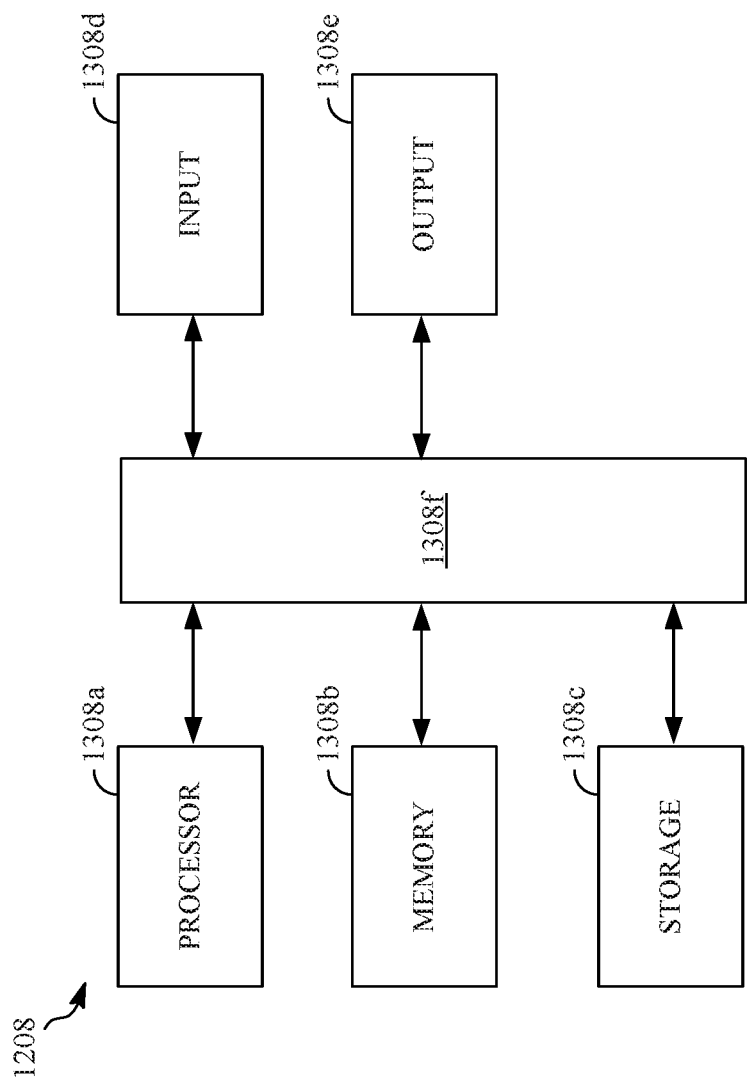
FIG. 13B is a schematic view of a controller of the vehicle shown in FIG. 1.

Referring to FIG. 13B, a hardware configuration for the controller 1308 is shown, which may be used to implement the apparatuses and systems described herein (e.g., to detect an impact upon occurrence thereof and/or predict an impact in expectation thereof, and to control the movement mechanisms). As an example, the controller 1308 may output a command, such as a voltage value, to the drivetrain 1306 in response to signals received from the sensors of the sensor modules 110 and/or to the various movement mechanisms (e.g., 440, 540, 640, etc., described herein).

The controller 1308 may include a processor 1308a, a memory 1308b, a storage device 1308c, one or more input devices 1308d (e.g., the sensors 412 and the additional sensors 1310), and one or more output devices 1308e (e.g., the drivetrain 1306 and the various movement mechanisms disclosed herein). The controller 1308 may include a bus 1308f or a similar device to interconnect the components for communication. The processor 1308a is operable to execute computer program instructions and perform operations described by the computer program instructions. As an example, the processor 1308a may be a conventional device such as a central processing unit. The memory 1308b may be a volatile, high-speed, short-term information storage device such as a random-access memory module. The storage device 1308c may be a non-volatile information storage device such as a hard drive or a solid-state drive. The input devices 1308d may include any type of human-machine interface such as buttons, switches, a keyboard, a mouse, a touchscreen input device, a gestural input device, an audio input device, the additional sensors 1310 of the vehicle 100, and/or the sensors 412 of the sensor modules 110. The output devices 1308e may include any type of device operable to provide an indication to a user regarding an operating state, such as a display screen or an audio output, or any other functional output or control, such as the drivetrain 1306 and the movement mechanisms described herein (e.g., 440, 540, 640, etc.).

What is claimed is:

1. A vehicle comprising:
   a vehicle body;
   a sensor that is arranged to observe an environment, the sensor being located within the vehicle body; and
   a movement mechanism for moving the sensor from an outward position to an inward position relative to the vehicle body in response to an impact of the vehicle or an expectation of an impact of the vehicle.

2. The vehicle according to claim 1, wherein the vehicle body has an outer surface and the outward position is closer to the outer surface than the inward position.

3. The vehicle according to claim 1, wherein the movement mechanism moves the sensor from the outward position to the inward position in response to a signal that represents detection of an impact to the vehicle or an expectation of an impact to the vehicle.

4. The vehicle according to claim 1, wherein the movement mechanism includes an electromechanical device.

5. The vehicle according to claim 1, wherein the movement mechanism includes a pneumatic device.

6. The vehicle according to claim 1, wherein the movement mechanism includes a pre-tensioned spring device that is releasable by an actuator.

7. The vehicle according to claim 1, further comprising:

an inner module structure; and an outer module structure, wherein the inner module structure and the outer module structure cooperate to define an interior, and the sensor is located in the interior.

8. The vehicle according to claim 7, wherein the outer module structure is a panel that permits transmission of wave types detected by the sensor.

9. The vehicle according to claim 8, wherein the vehicle body has an outer surface, and the outer module structure is positionable adjacent to the outer surface of the vehicle body.

10. The vehicle according to claim 9, wherein the sensor is connected to the inner module structure and the movement mechanism moves the inner module structure and the outer module structure with the sensor from the outward position to the inward position.

11. The vehicle according to claim 9, wherein the sensor is connected to the inner module structure and the movement mechanism moves the inner module structure and the sensor relative to the outer module structure from the outward position to the inward position.

12. The vehicle according to claim 9, wherein the movement mechanism moves the sensor within the interior relative to the inner module structure and the outer module structure from the outward position to the inward position.

13. The vehicle according to claim 1, further comprising:
an inner module structure; and
an outer module structure, wherein the inner module structure and the outer module structure cooperate to define an interior, and the sensor is located in the interior,
wherein the vehicle body has an outer surface and the outward position is closer to the outer surface than the inward position,
wherein the movement mechanism includes an electromechanical device,
wherein the outer module structure is a panel that permits transmission of wave types detected by the sensor, and
wherein the outer module structure is positionable adjacent to the outer surface of the vehicle body.

14. A vehicle comprising:
a vehicle body;
an opening defined by the vehicle body;
a sensor module that is located in the opening, is movably mounted relative to the vehicle body, and defines an interior; and
a sensor disposed in the interior of the sensor module,
wherein the sensor module is able to move relative to the vehicle body from an outward position to an inward position in response to application of an external force to the sensor module.

15. The vehicle according to claim 14, wherein the sensor module is able to move relative to the vehicle body from the inward position to the outward position in response to removal of the external force from the sensor module.

16. The vehicle according to claim 14, further comprising:
a resilient biasing element that urges the sensor module toward the outward position.

17. The vehicle according to claim 14, further comprising:
a movement mechanism that can be switched from a locked position, in which passive movement of the sensor module is restrained, to an unlocked position, in which passive movement of the sensor module is allowed, in response to a signal that indicates an actual impact or an expected impact.

18. The vehicle according to claim 1, further comprising a base structure that forms a sensor module with the sensor;
wherein the base structure includes an outer portion and an inner portion that define an interior, wherein the outer portion is less rigid than the inner portion to allow deformation in response to application of an external force, and the sensor is disposed in the interior of the sensor module and is connected to the inner portion of the sensor module.

19. The vehicle according to claim 18, wherein the movement mechanism connects to the sensor to the inner portion of the sensor module for movement within the interior of the sensor module between the outward position and the inward position relative to the vehicle body.

20. The vehicle according to claim 19, wherein the movement mechanism moves the sensor from the outward position to the inward position in response to a signal that indicates an actual impact or an expected impact.

21. The vehicle according to claim 1, wherein the movement mechanism moves the sensor from the outward position to the inward position in response to the impact of the vehicle.

22. The vehicle according to claim 1, wherein the movement mechanism moves the sensor from the outward position to the inward position in response to the expectation of the impact of the vehicle.

23. The vehicle according to claim 1, further comprising another sensor that is arranged to observe the environment, the movement mechanism being configured to move the sensor and the other sensor from the outward position to the inward position.

24. The vehicle according to claim 1, further comprising another sensor that is arranged to observe the environment and another movement mechanism configured to move the other sensor from another outward position to another outward position in response to an impact of the vehicle or an expectation of an impact of the vehicle and independent of the movement mechanism moving the sensor.

25. The vehicle according to claim 14, wherein the outward position is an outboard position relative to the vehicle body, and the inward position is an inboard position relative to the vehicle body.

26. The vehicle according to claim 18, wherein the sensor module includes the base structure and an outer module structure that cooperatively define the interior.

* * * * *